Nov. 24, 1925.
F. T. MILLER
1,562,904
AUTOMATIC SELECTIVELY OPERATED MECHANISM
Filed Jan. 26, 1925    14 Sheets-Sheet 1
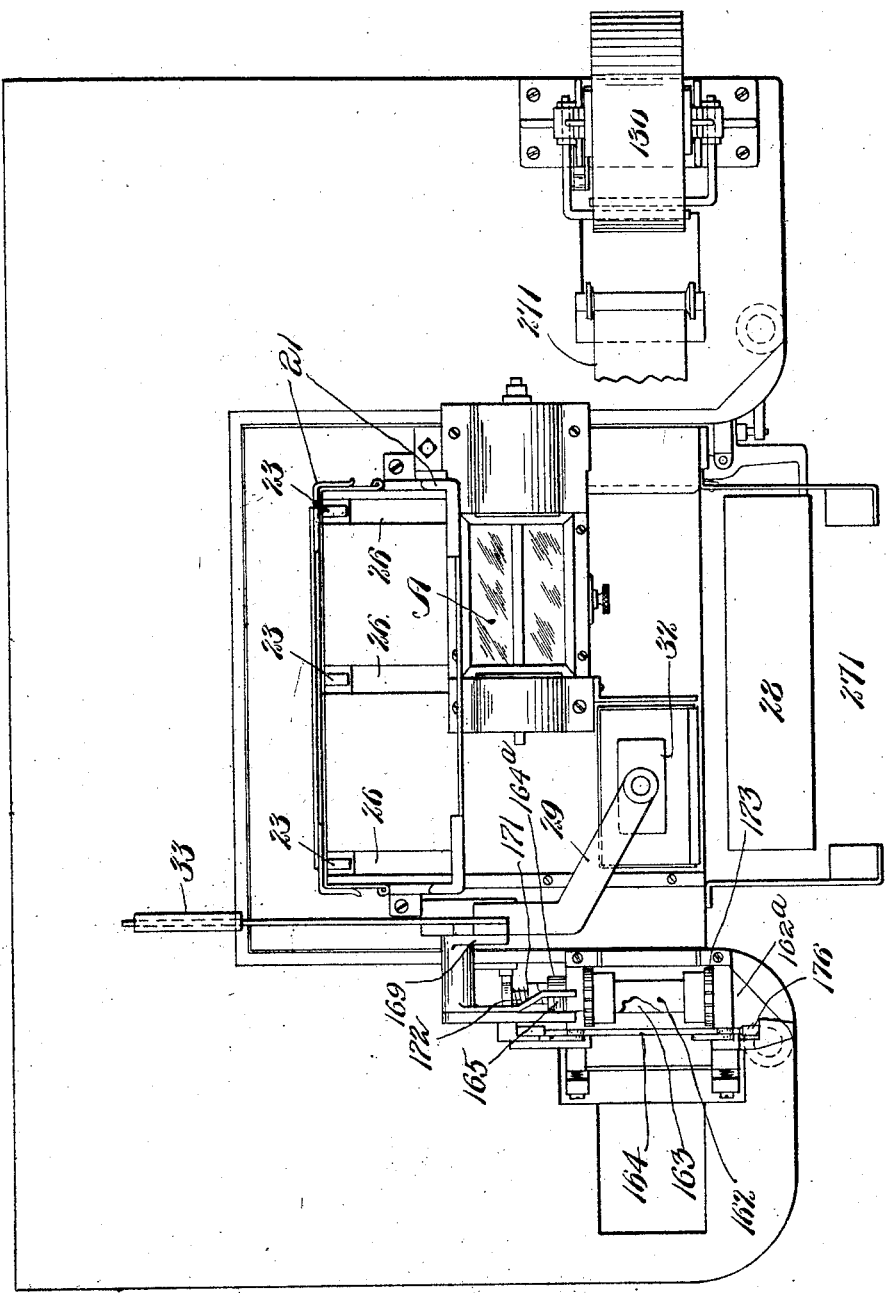

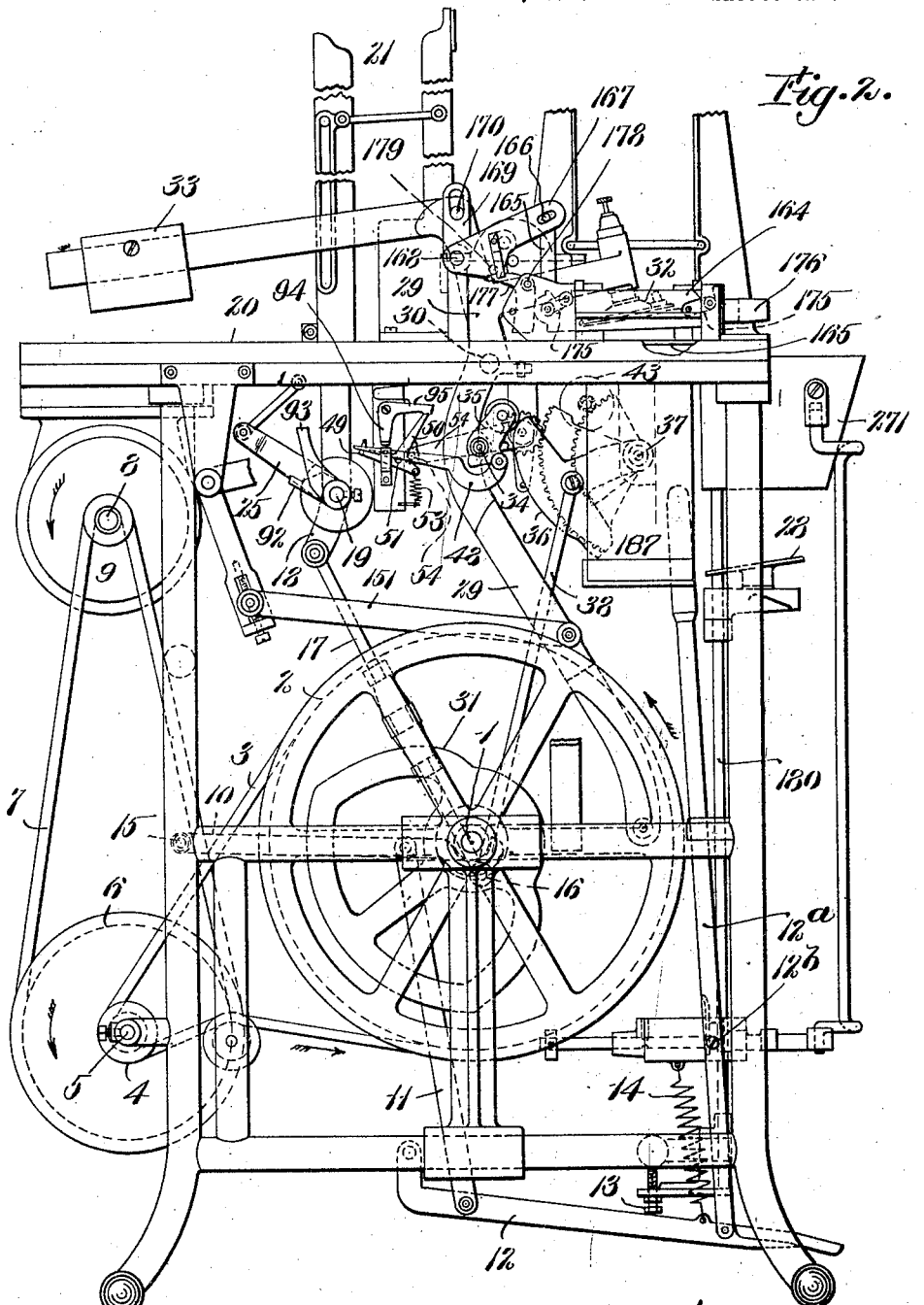

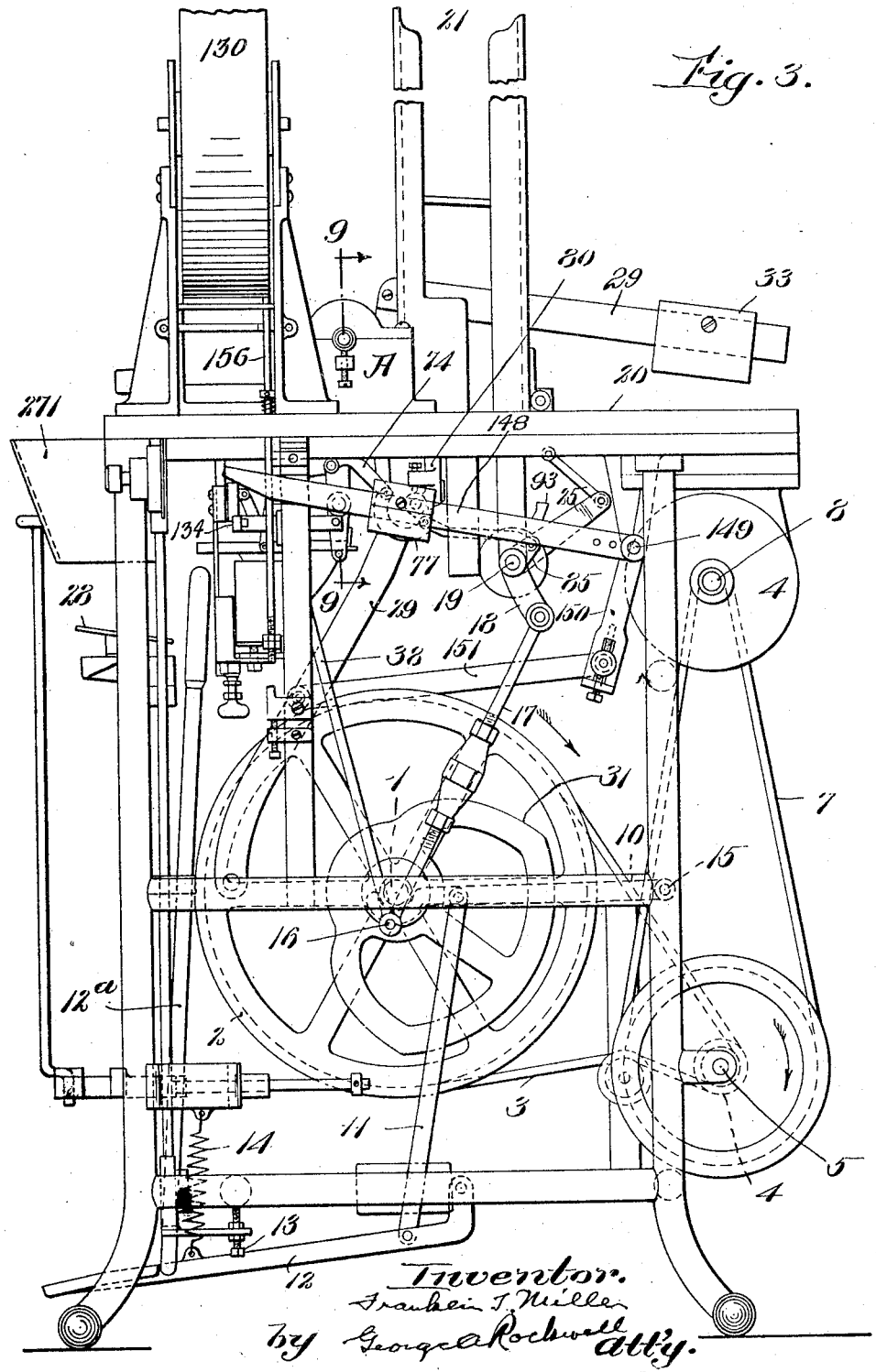

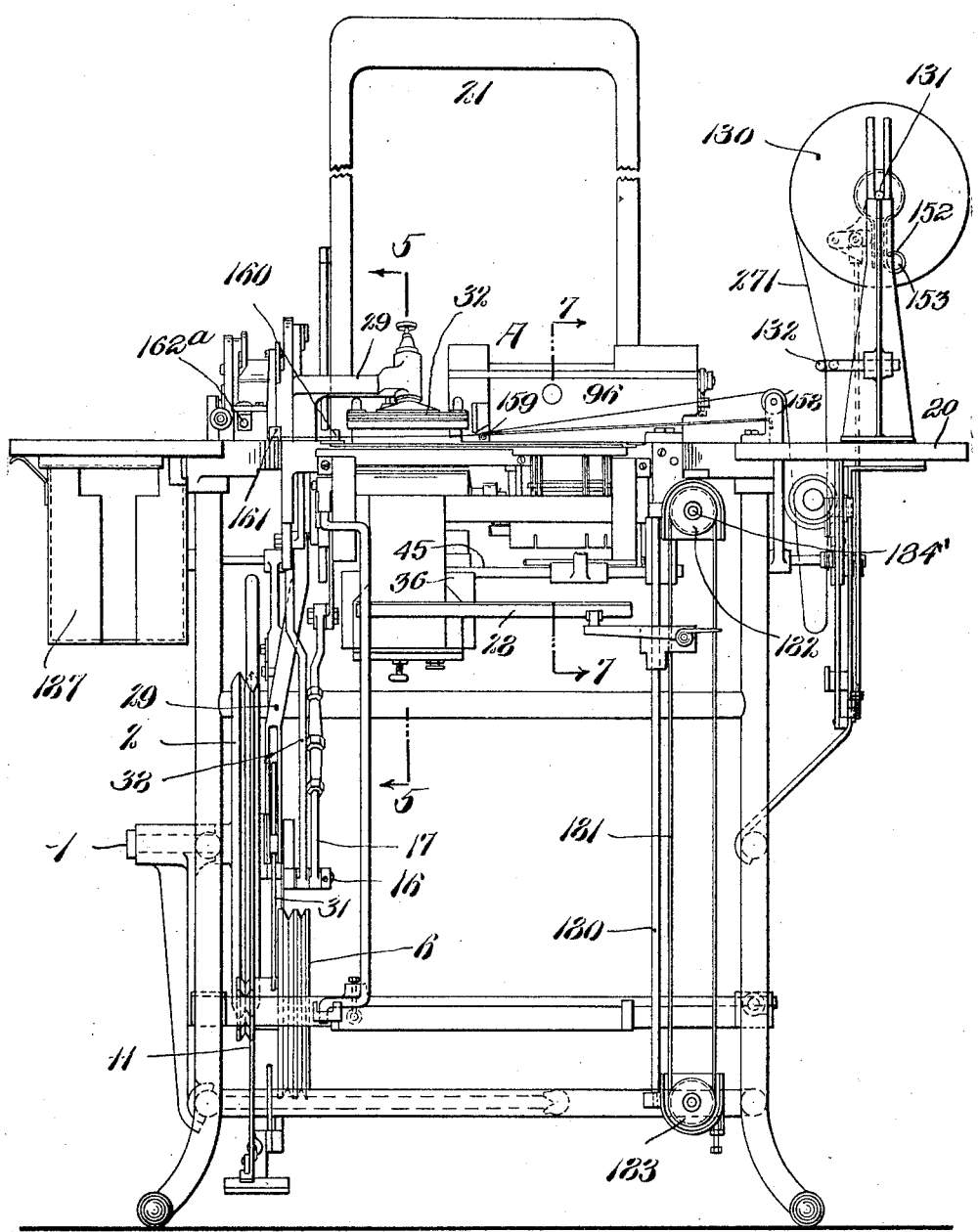

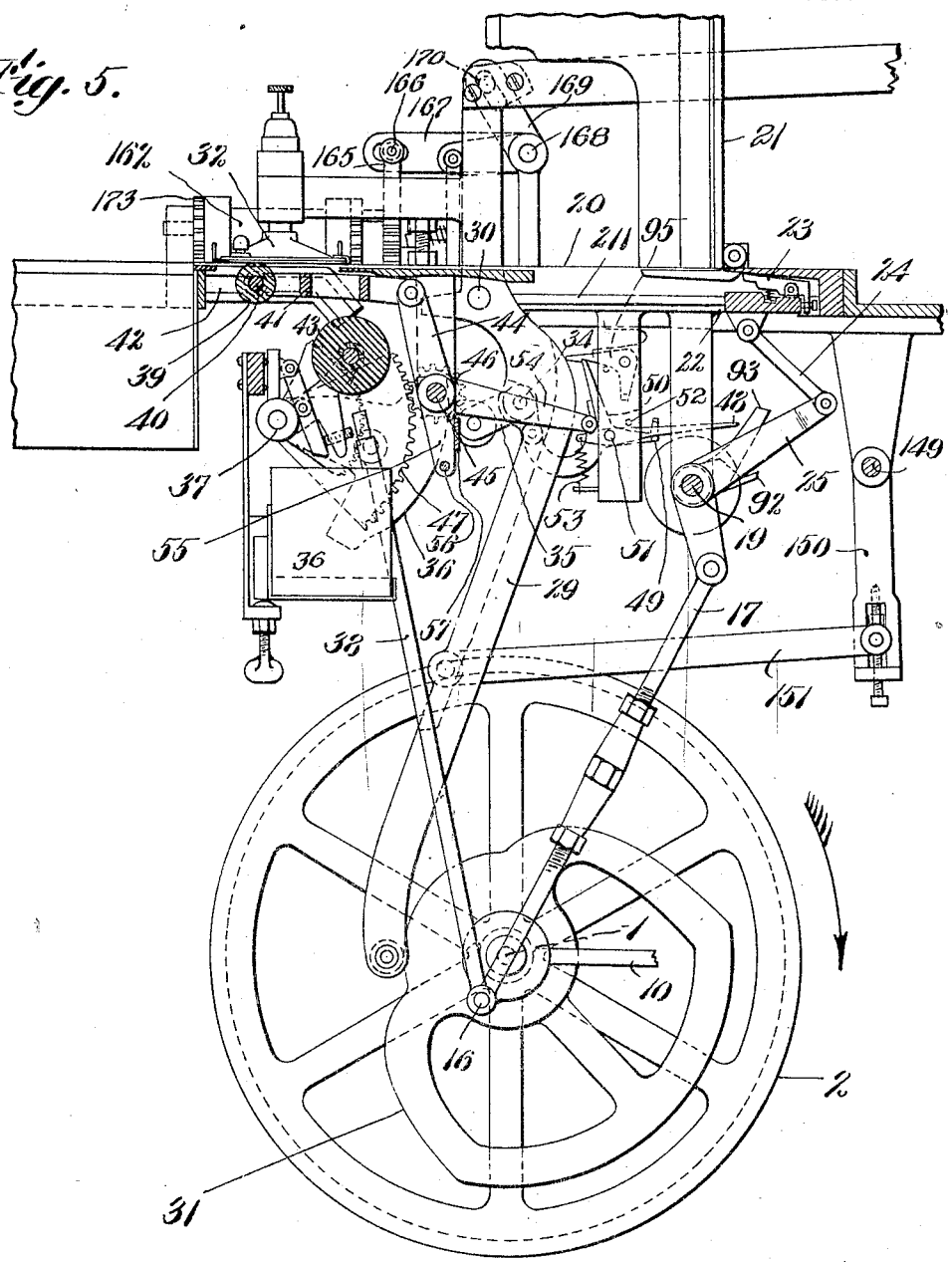

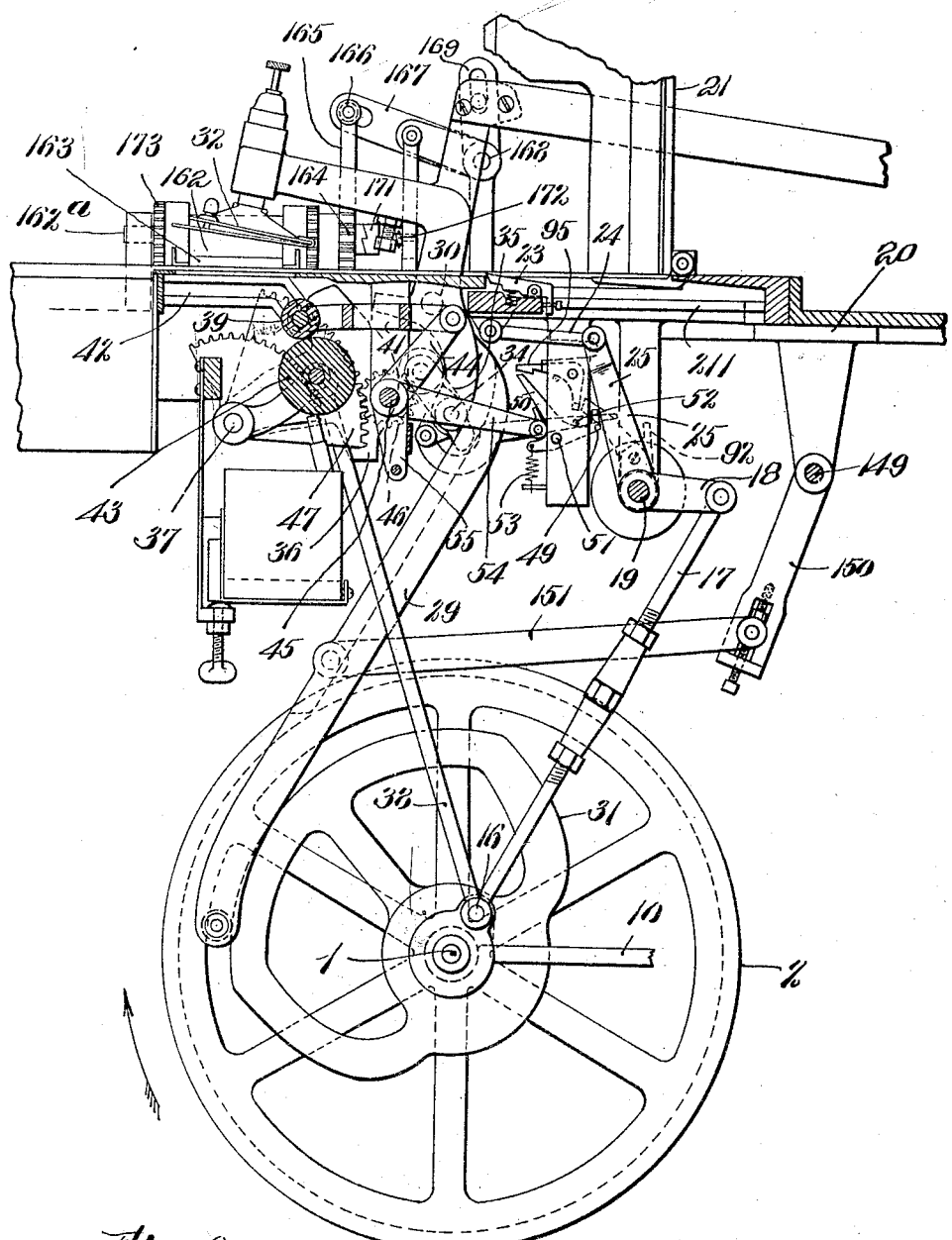

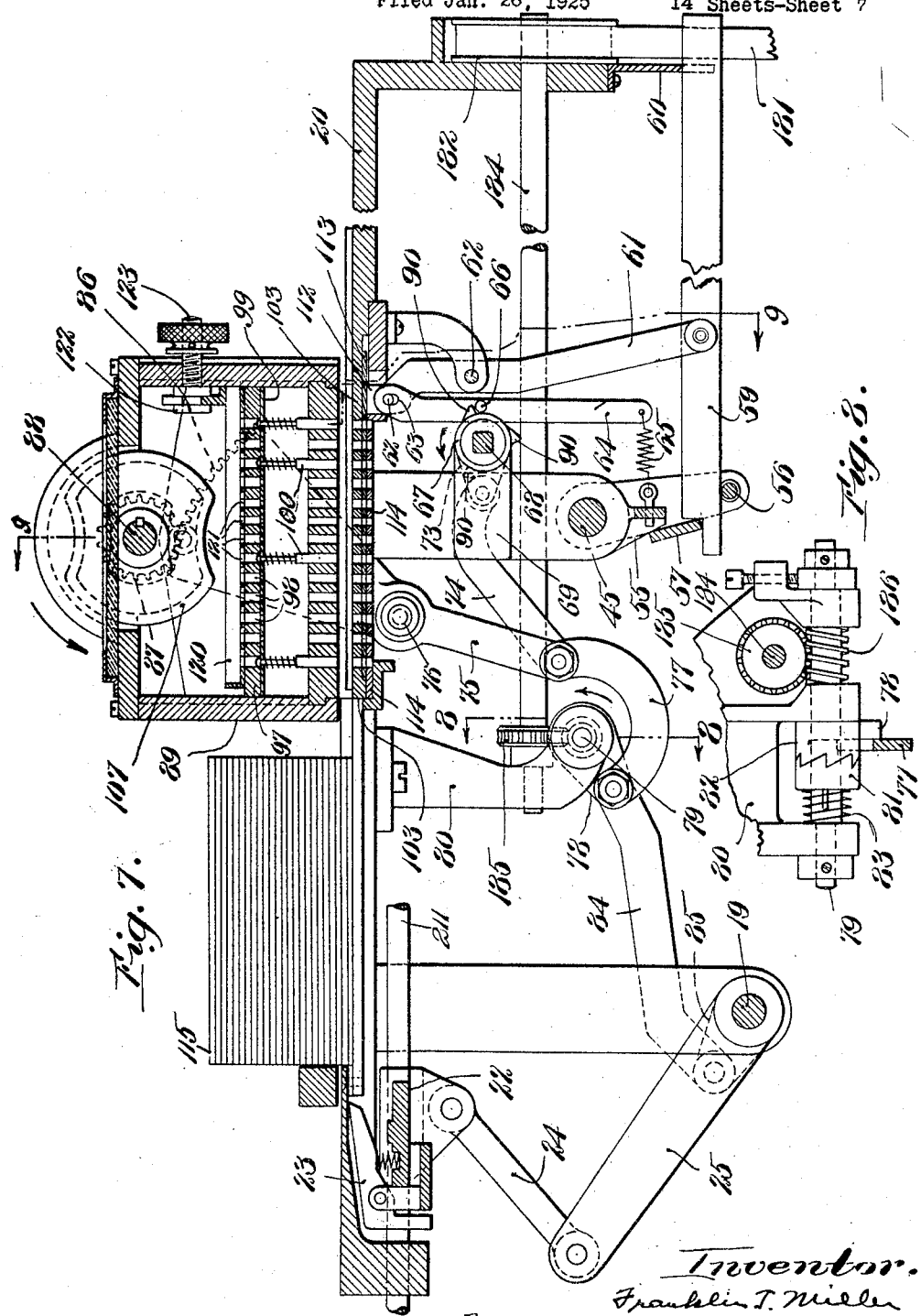

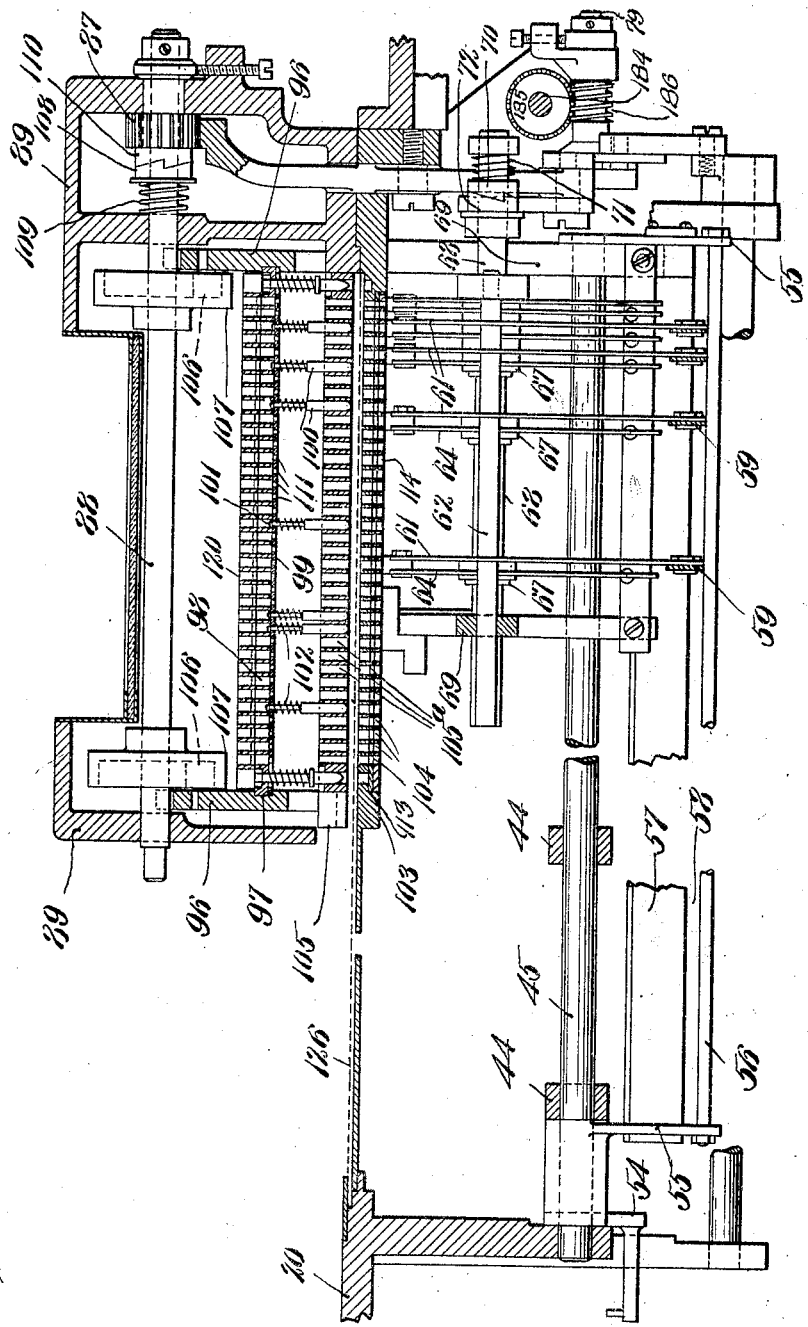

Nov. 24, 1925.
F. T. MILLER
1,562,904

AUTOMATIC SELECTIVELY OPERATED MECHANISM

Filed Jan. 26, 1925
14 Sheets-Sheet 9

Inventor:
Franklin T. Miller
by George A. Rockwell,
atty.

Nov. 24, 1925.
F. T. MILLER
1,562,904
AUTOMATIC SELECTIVELY OPERATED MECHANISM
Filed Jan. 26, 1925    14 Sheets-Sheet 10
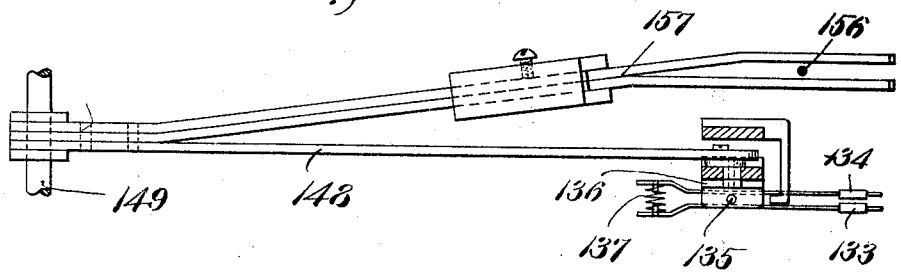
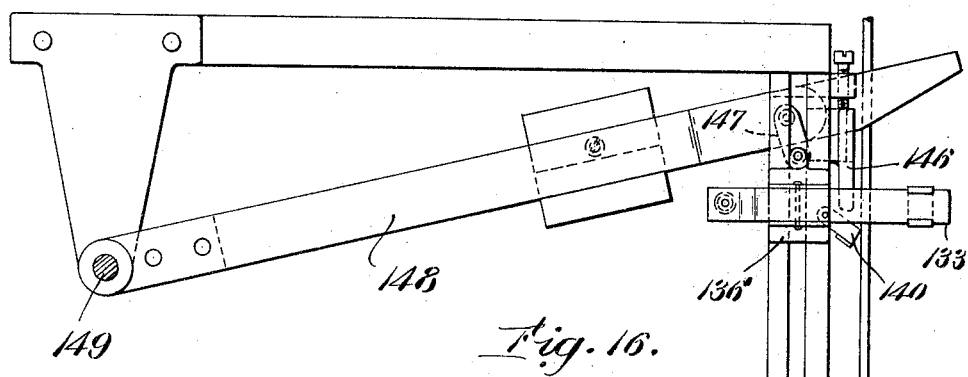
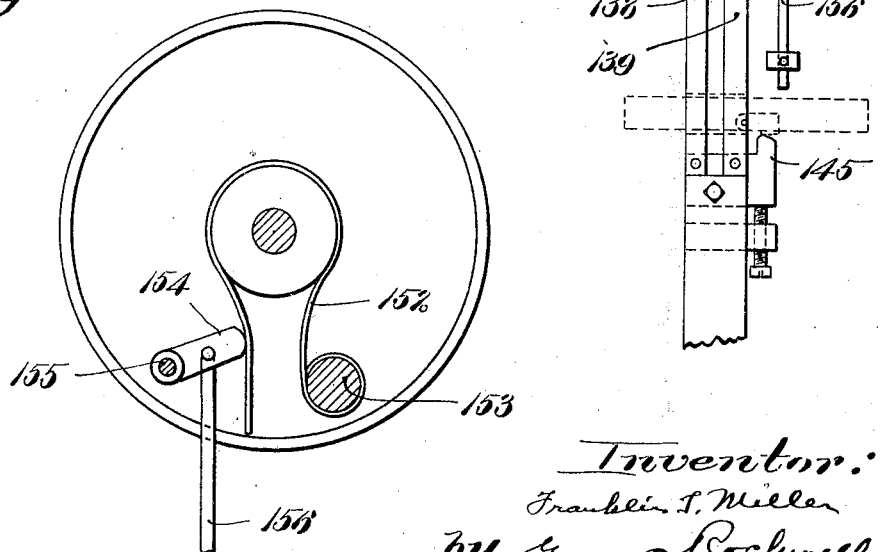
Inventor:
Franklin T. Miller
by George A Rockwell,
atty.

Nov. 24, 1925.

F. T. MILLER 1,562,904

AUTOMATIC SELECTIVELY OPERATED MECHANISM

Filed Jan. 26, 1925    14 Sheets-Sheet 11

Inventor
Franklin T. Miller
by George A Rockwell,
attorney.

Nov. 24, 1925.

F. T. MILLER 1,562,904

AUTOMATIC SELECTIVELY OPERATED MECHANISM

Filed Jan. 26, 1925   14 Sheets-Sheet 12

Inventor
Franklin T. Miller
by George A Rockwell
atty.

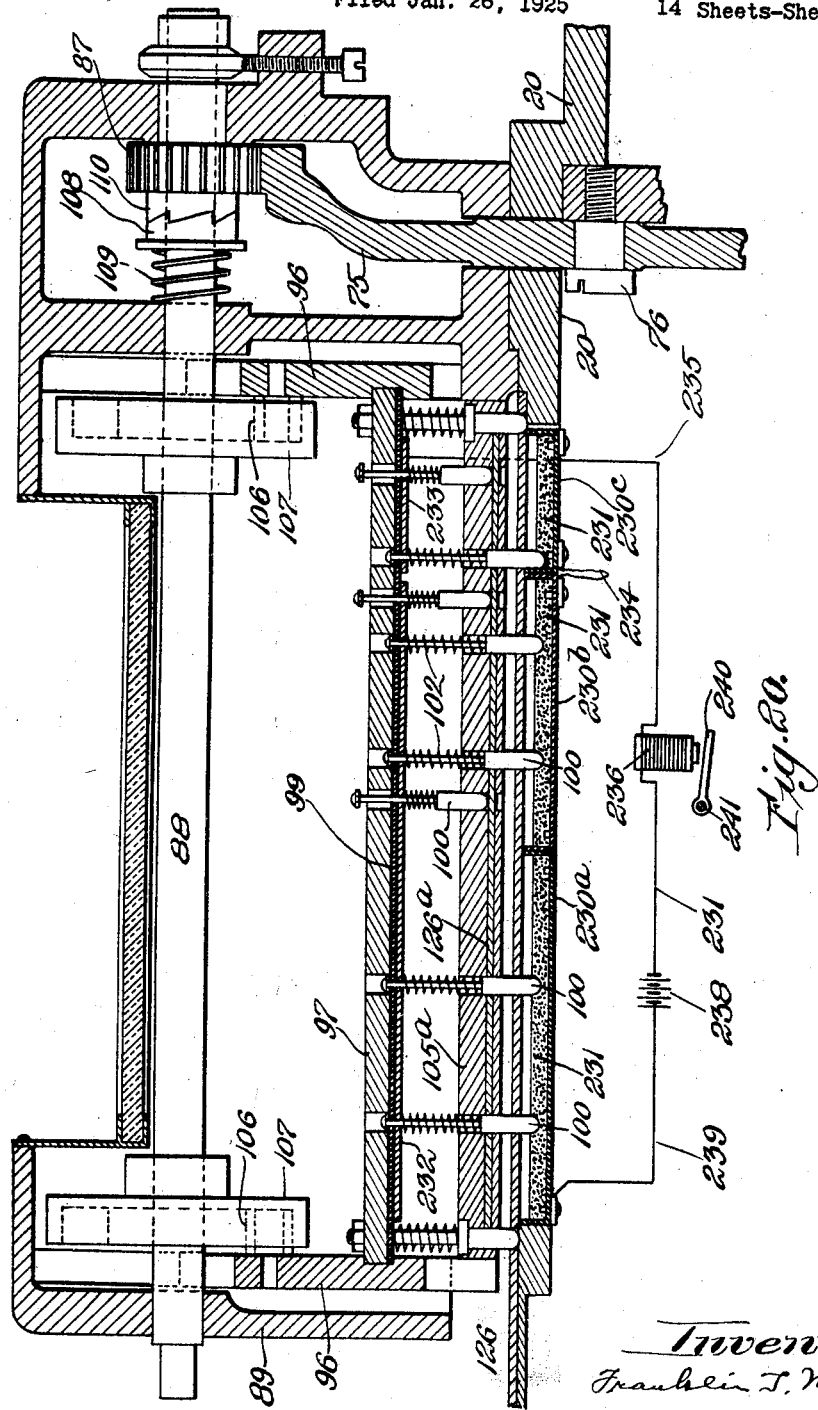

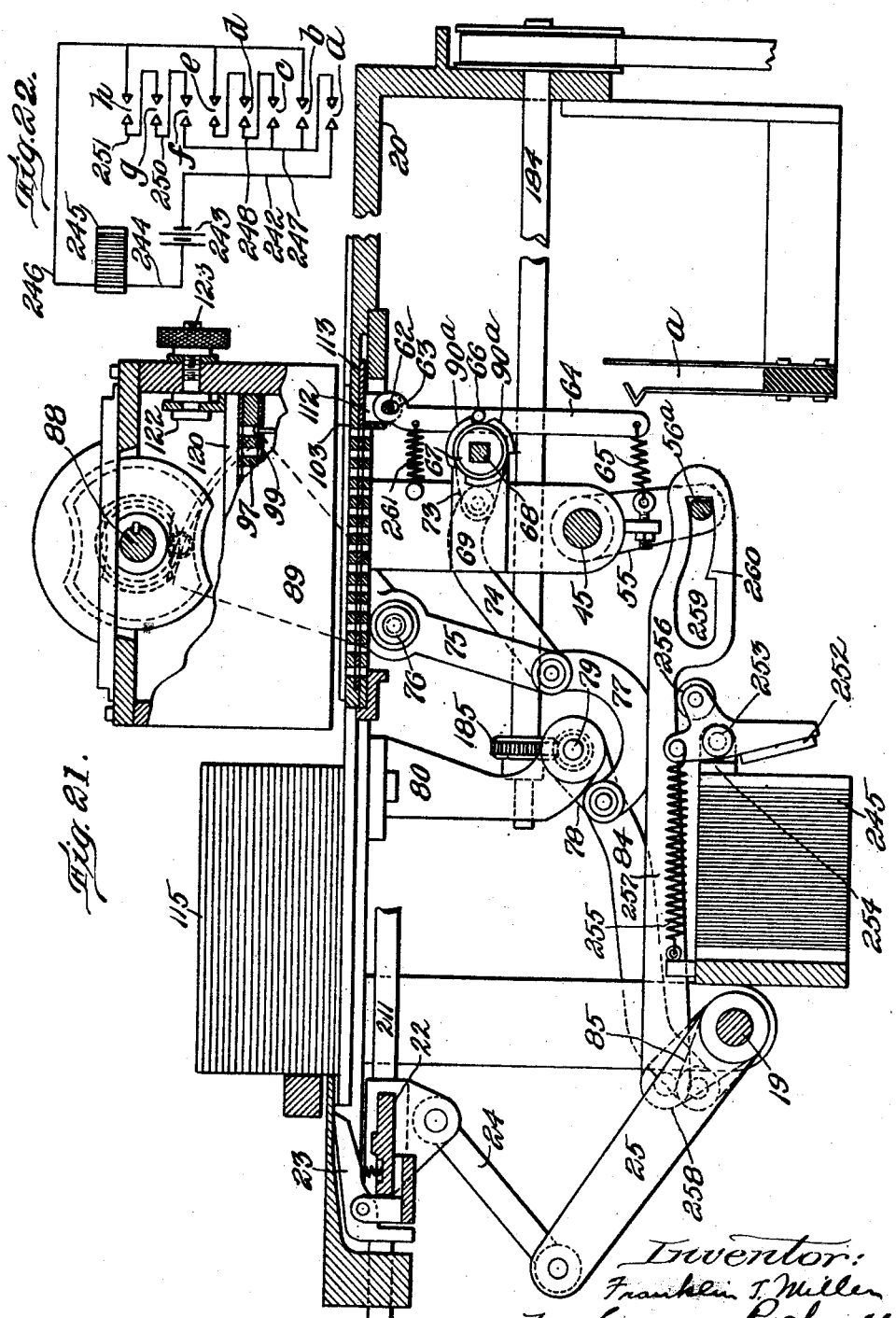

Patented Nov. 24, 1925.

1,562,904

UNITED STATES PATENT OFFICE.

FRANKLIN T. MILLER, OF NEWTON, MASSACHUSETTS.

AUTOMATIC SELECTIVELY-OPERATED MECHANISM.

Application filed January 26, 1925. Serial No. 4,809.

*To all whom it may concern:*

Be it known that I, FRANKLIN T. MILLER, a citizen of the United States, and resident of Newton, in the county of Middlesex and State of Massachusetts, have invented a new and useful Automatic Selectively-Operated Mechanism, of which the following is a specification.

My invention relates to machines for use in connection with a plurality of units such as cards or the like, having different characteristics said units being fed through the machine and, during their passage through the latter, serving to determine and control the operation thereof according to said characteristics.

The invention has for its object to provide a machine of the character indicated and particularly to provide a machine of this kind which will be selectively operated and controlled by a set or plurality of control units or cards to effect printing or other operations.

The basic feature of my invention is a mechanism designed to handle, and to be selectively controlled by, a plurality of cards, or other suitable control units, of two or more different classes, the cards of each class having, exclusively, a certain suitable physical characteristic which distinguishes them from the cards or units of the other class or classes, and said mechanism including detecting means or devices which engage the cards or units successively and through which the latter control the operation of an element or member of the mechanism according to their physical characteristics. The detecting means is constructed, and co-operates with the units, so as to affect, or effect, the operation of said element or member only when influenced or caused so to do by a unit of one class having a particular physical characteristic, and so as to be unresponsive to its engagement with other cards having different physical characteristics, so far as its effect upon the operation or normal state of said element or member is concerned.

In the embodiment of my invention herein shown the cards or units are stencils and the operation of the element or member referred to above results in effecting a printing or stencilling operation upon a piece, or strip, of paper; but this operation is effected only by a card or unit having the effective physical characteristic, the other cards or units having other characteristics passing through the machine without affecting its operation. A printing machine of this particular type may be used for various purposes. For example, each card or unit may be given a physical characteristic corresponding with a given subject involving a dominant factor and one or more groups of subordinate factors, by punching particularly located holes therein whose positions on the card correspond with the particular subject and its particular combination or group of factors. Thus, cards relating to two or more similar subjects involving the same factors will be similarly perforated while other cards differing in any one or more of these particulars will have some or all of their holes or perforations differently located. Thus, each stencil card is, in effect, divided into zones, one allotted to each factor and it will usually be necessary or desirable to divide each zone or some of the zones, into sub-zones. For example, a zone allotted to a given factor may be divided into sub-zones whose positions within that main zone represent variations of that factor.

The detecting mechanism is adjusted or constructed so that only those cards having particularly and similarly located holes or perforations effectively co-operate therewith to cause the machine to print, the other cards passing idly through the machine. Provision may be, and preferably is, made for adjustment of the detecting mechanism to adapt it to effectively cooperate exclusively with a card, or cards, having any particular one of a multitude of possible combinations of holes or perforations, and in the present instance this is accomplished by use of what I term "master cards" or units, one of which is installed as part of, or used in connection with, the detecting mechanism to set or maintain it in a given adjusted condition corresponding with one particular combination of holes or perforations, each time the set of cards is fed through the machine.

When the machine herein shown is applied to the use suggested above a master card is preferably provided for each subject and a stencil card for each combination of factors, the master card being used to adjust or set the machine so that it will be effectively operated only by stencil cards whose physical characteristics correspond with a given combination of factors. It will therefore be clear that when the set of stencil cards is passed through the machine while a master card is incorporated in the detecting mechanism, or after the machine has been adjusted by means of a master card, the machine will operate automatically to print from all of the stencil cards in the set that have perforations corresponding in position with the adjustment of the detecting mechanism maintained or secured by that master card. Thus the machine selectively prints from a multiplicity of stencil cards only that matter that accords with a particular combination of factors related to a given subject. This printing may be done by the ordinary mimeograph method and while every card of the set goes through the machine, the determination of whether or not a stencil shall be printed is made by the detecting mechanism in accordance with the adjustment or control thereof as maintained by the master card.

Other features of my invention are hereinafter pointed out.

In the accompanying drawings:

Figure 1 is a top plan view of a selective printing machine constructed in accordance with my invention.

Figure 2 is an elevation of the left hand end of the machine shown in Fig. 1.

Figure 3 is an elevation of the right hand end of the machine shown in Fig. 1.

Figure 4 is a front elevation of the machine shown in Fig. 1.

Figure 5 is a section on line 5—5 of Fig. 4.

Figure 6 is a view like Fig. 5 but showing the parts in different positions.

Figure 7 is an enlarged section on line 7—7 of Fig. 4.

Figure 8 is a sectional detail on line 8—8 of Fig. 7.

Figure 9 is a section on line 9—9 of Fig. 3.

Figure 11 is a detail hereinafter described.

Figures 15, 16 and 17 are details relating to the paper feeding mechanism.

Figure 20 illustrates another form of pin box.

Figure 21 is a sectional view of an alternative construction of detector mechanism which may be employed in lieu of that illustrated particularly in Fig. 7.

Figure 22 is a diagrammatic view of the electrical circuit, and elements included therein, of the mechanism shown in Fig. 21.

Figure 10:
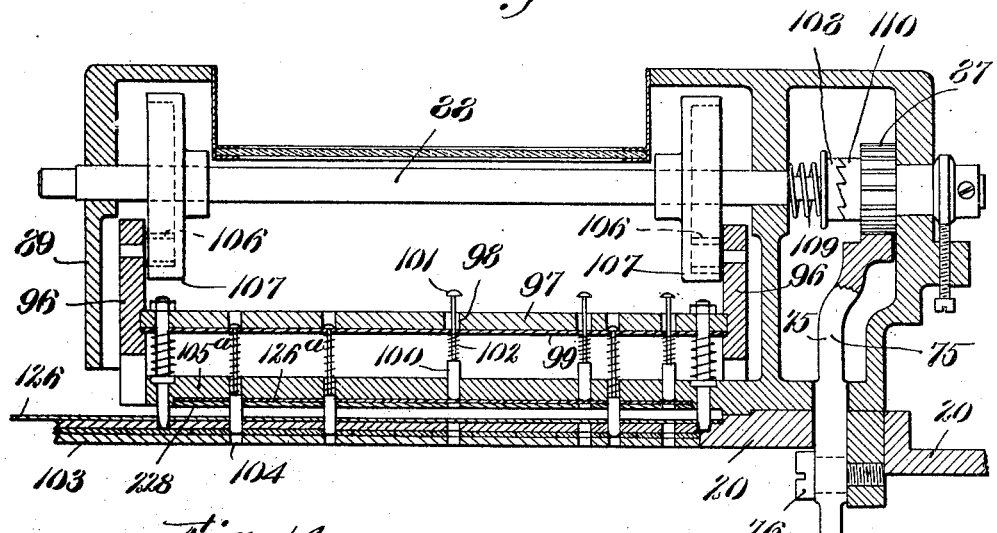
Figure 10 is a sectional detail illustrating a modification of the detecting mechanism.

The machine in the accompanying drawings comprises a main shaft 1, on which is loosely mounted a pulley 2 that is connected by a belt 3 with a pulley 4 fast on a shaft 5 journaled in bearings on the frame of the machine. This shaft 5 carries another pulley 6 connected by a belt 7 with a pulley 8 on the armature shaft of a motor 9. Through the connections described the pulley 2 is continuously driven in the direction indicated by the arrow in Fig. 2. The hub of the pulley 2 is made with a clutch mechanism of usual construction that is controlled by means of a lever 10, Figs. 2, 5 and 6, and this lever 10 is connected by a link 11 with a foot treadle 12 normally held elevated against a stop 13 by a spring 14. The lever 10 is fulcrumed at 15 on the frame of the machine and is normally held by spring 14 in position to maintain the continuously driven pulley 2 disconnected from the main shaft 1. When the treadle 12 is depressed it acts through the link 11 to pull down the free end of lever 10 thereby allowing the clutch mechanism referred to to connect the pulley 2 with the shaft 1, which latter then rotates with the pulley.

Shaft 1 carries a wrist pin 16 connected by a pitman 17 with an arm 18 fast on a rock shaft 19. This rock shaft 19 is supported in bearings upon the underside of a table 20 having upon its top side a hopper 21 within which is placed a stack of stencil cards 115, Fig. 13, said cards resting upon and being supported by the top of table 20. To the under side of table or bed 20 is secured a plurality of parallel rods 211, Figs. 5, 6 and 7, upon which is slidably mounted a carriage 22 having pivotally mounted thereon three spring pressed dogs 23. The carriage 22 is connected by links 24 with arms 25 fast on the rock shaft 19 so that as shaft 1 rotates with the pulley 2 and the wrist pin 16 acts through the connections described to rock the shaft 19 the carriage 22 will be reciprocated on the guide bars 211 thus shifting the feed dogs 23 toward and from the front of the machine beneath hopper 21. The table 20 is formed with three slots 26 as shown in Fig. 1, through which the dogs 23 project to engage the lowermost stencil card within hopper 21 and feed it forward into position under the detecting mechanism that is located at A, Fig. 1, each time carriage 22 moves forward toward the front of the machine.

The first or lowermost card is fed forward into position under the detecting mechanism A during one revolution of the main shaft 1 and during the next, or second, revolution of the main shaft 1 the feed dogs are again operated to feed forward a stencil card from the hopper 21 and as said second card is thus fed forward it engages the rear edge of the first card and shoves the latter still further forward into printing position beneath a strip of paper 271, Fig. 4.

As referred to above the detecting mechanism A is adjusted or set by the use of a master card so as to effectively cooperate only with cards having one definite combination of perforations, and if the first card fed forward into position under the detecting mechanism A has this particular combination of perforations, then during the first revolution of the shaft 1 certain mechanism presently to be described, and including a member 35, Fig. 2, will be set or prepared by the detecting mechanism so that during the next, or second, revolution of the shaft 1, and after the first stencil card has been fed forward into printing position by the second stencil card, printing mechanism will be operated to print upon the strip 271 the stencil of that first card.

If this first card is one which does not have the particular combination of perforations referred to, then the detecting mechanism A will not, during the first revolution of shaft 1, be caused to set the devices referred to which include member 35, to effect a printing operation during the next or second rotation of the shaft 1, and said first stencil card will idly remain in printing position during the second revolution of shaft 1.

During the third revolution of the shaft 1 a third card is fed forward into position under the detecting mechanism A shoving the second card into printing position and causing the latter to shove the first card into a receiving hopper 27, the cards discharged into this hopper being supported by a shelf 28 that is automatically adjusted downward as the pile or stack of cards upon it grows in height, thereby maintaining the top of the pile or stack below a predetermined horizontal plane.

It will thus be clear that each cycle of the machine comprises three revolutions of the main shaft 1, the first revolution feeding a card into position under the detecting mechanism A, the second revolution feeding that card from the detecting mechanism A into printing position and the third revolution feeding that card from printing position into the hopper 27.

The printing mechanism includes a platen lever 29, Figs. 1, 2 and 4, that is pivotally supported at 30 on the frame of the machine, the lower end of said lever carrying a cam roll co-operating with a cam 31 fixed on the main shaft 1. At its upper end the lever 29 is made with a forwardly extending arm carrying a platen 32 and with a rearwardly extending arm carrying a counterweight 33 which about counterbalances the weight of the lever and parts carried by it at the opposite side of the fulcrum 30. Pivotally mounted at 34 upon the depending arm of lever 29 is an arm 35 carrying at its free end a cam roll co-operating with a cam 36 fast on a rock shaft 37, said cam 36 being connected by a link 38 with the wrist pin 16 carried by main shaft 1. Thus it will be clear that the shafts 19 and 37 are continuously rocked by the rotation of wrist pin 16 so long as the treadle 12 is held depressed.

The arm 35 is automatically adjusted on its pivote 34, as presently to be described, so as to occupy either an elevated position, relatively to lever 29, which places it out of co-operative relationship with cam 36, or a depressed position where it co-operates with said cam. This automatic positioning of arm 35 is effected at a time when the cam 36 is at the limit of its swing upward, or approximately so, so that if said arm is caused to occupy its lowermost position, then when the cam 36 moves downward it acts through the arm 35 to swing lever 29 on its fulcrum 30 in a direction to lower the platen into its operative position shown in Fig. 5 where it holds the paper strip 271 down against the top side of the stencil of the card then occupying printing position. While the platen thus occupies its operative position an ink transfer roll 39, Figures 5 and 6, moves rearwardly (toward the right in Figs. 5 and 6) while the paper and stencil are pressed toward it by the platen and prints upon the strip the matter of the stencil. The ends of the shaft 40 of the ink transfer roll 39 are journaled in the arms of a yoke 41 and also project beyond said arms into cam grooves 42 provided on the frame of the machine. These cam grooves serve to hold the transfer roll against the under side of the stencil for the greater part of the movement of the roll back and forth beneath the latter, and also to lower said transfer roll on to a stationarily supported ink supplying roll 43, Figs. 2, 5 and 6, as the transfer roll nears its rearmost position.

The rear end of the yoke 41 is pivotally connected to an arm 44 fast on a rock shaft 45 journaled in bearings on the frame of the machine. This rock shaft 45 carries at one end a pinion 46 engaged and actuated by a segment 47 fast on the rock shaft 37 which carries the cam 36, said cam and segment being vibrated in unison whenever the wrist pin 16 is in motion.

When the operator permits the spring 14, acting through lever 12 and link 11, Fig. 2, to raise the lever 10 into position to disconnect the pulley 2 from the shaft 1, the wrist pin comes to rest in a position immediately above the shaft 1, just back of its position as shown in Fig. 6, and this is the position from which the pin 16 starts at the beginning of each cycle of the machine.

Thus, when the main shaft 1 is at rest, the cam 36 occupies its elevated position and the feed dogs 23 are near the limit of their movement toward the front of the machine, there being a stencil card in position at the detecting mechanism A and a stencil card in printing position under the paper strip 271 if the machine is stopped before the supply of cards within the hopper 21 is exhausted. When the cam 36 occupies its uppermost position or is near the limit of its movement upward, the arm 35 is free to swing on its pivot 34 to the limit of its movement in either direction without interference or engagement with cam 36. During the latter part of each rotation of the wrist pin 16, as the latter approaches its stopped position, immediately after the feed dogs reach the end of their forward stroke, the detecting mechanism A engages the stencil card just fed from the hopper 21 and thereby determines the position that the arm 35 shall occupy during the next rotation of the wrist pin. If this last stencil card is provided with the effective combination of perforations, then the arm 35 will remain down in its lowermost position, shown in Fig. 5, during the next rotation of the wrist pin, but, if this last card is not provided with the effective combination of perforations, then the arm 35 will be caused to occupy its elevated inoperative position shown in Fig. 6, during this next rotation of the wrist pin.

The arm 35 is part of a bell-crank whose other arm has pivotally connected with it one end of a push-bar 48 whose opposite free end is supported by a pin 49, Fig. 2, projecting laterally from a three-arm lever 50 fulcrumed at 51 on the frame of the machine, and normally held against a stop pin 52 on the frame of the machine by a spring 53, Fig. 6. The upwardly extending arm of lever 50 is co-operatively disposed with relation to a rearwardly extending arm 54 forming part of a frame including also a pair of arms 55, Fig. 9, pivotally supported by the shaft 45, before referred to, through which the printing roll 39 is actuated, and two cross-bars 56 and 57, (Figs. 7 and 9) rigidly connected at their ends with the arms 55. The arm 54 serves as a weight to yieldingly urge the arms 55 toward the front of the machine, the downward movement of said arm 54 being limited by the engagement of lever 50 with its stop pin 52.

The two cross-bars 56 and 57 provide between them a slot 58 occupied by the rear ends of a plurality of push-bars 59 whose front ends are guided and laterally supported by a slotted plate 60 forming part of the frame of the machine, the rear ends of push-bars 59 abutting against bar 57. To each push-bar 59 is pivotally connected the lower arm of an upright sheet metal lever 61 fulcrumed intermediate its ends at 62 on the frame of the machine. The upper arm of each lever 61 is connected through a pin 62 and slot 63 with two elements or members, one of which is a sheet metal lever 64 whose fulcrum, when it serves as a fulcrum, is a spring 65, one end of which is connected with the lower end of the lever 64 and the other end with the frame of the machine. Intermediate its ends each lever 64 is provided with a laterally projecting stud 66 that is held against one of a plurality of cams 67 fixed on a relatively short shaft 68 journaled in brackets 69 secured to the under side of the table 20. These brackets 69 also assist in supporting the shaft 45.

Near one end thereof the shaft 68 has splined on it a clutch member 70 yieldingly held by a spring 71 against a counterpart clutch member 72 provided with an arm 73, Fig. 7, connected by a link 74 with one arm of a lever 75 fulcrumed at 76 on the frame of the machine. The same arm of lever 75 is connected by a link 77 with an arm 78 whose hub 82, Fig. 8, constitutes one member of a clutch, said hub being loosely mounted on a short shaft 79 journaled in a depending bracket 80 secured to the under side of table 20. On this short shaft 79 is splined a counterpart clutch member 81 yieldingly held against the hub 82 by a spring 83. A third link 84 connects the link 77 and the clutch arm 78 with an arm 85 fast on the shaft 19, heretofore referred to. Through the link connection 84, 77 and 74, a vibratory movement is imparted to each clutch arm 78 and 73, and lever 75, from rock shaft 19 during each revolution of wrist pin 16. The lever 75 is fulcrumed intermediate its ends, one arm being connected as described with the links 74 and 77, and the other being formed with a gear segment 86 in mesh with, and actuating, a pinion 87, Figs. 7 and 9, loosely mounted upon a cam shaft 88 journaled in bearings provided on what I herein refer to as the pin box 89 of the detecting mechanism.

The pin box 89 is secured to and supported by the frame of the machine at one side of the path of the stencil cards and so as to overhang said path as will be clear from Figs. 7 and 9.

The cam shaft 68 and the shaft 79 are rotatively adjusted one-third of a revolution in the directions indicated by the arrows during each revolution of wrist pin 16, and during the same time the segment lever 75 imparts one-half of a revolution to the cam shaft 88 of the pin box, the shafts 68 and 79 being actuated one step during each forward movement of feed carriage 22 and the shaft 88 one step of 180 degrees during each rearward movement thereof.

For each lever 64 there are provided on shaft 68 three cam projections 90 (Fig. 7) co-operating with the stud 66 of their lever 64 and each step movement of shaft 68 carries one of these cam projections past said stud, thereby imparting one complete vibratory movement to the lever 64. All of the levers 64 are simultaneously acted upon in this manner during each revolution of wrist pin 16, and if the pin 62 of any one (or more) of said levers is held against bodily movement laterally as hereinafter described, then when said lever 64 is actuated by one of the cam projections 90 it will be swung on said pin 62 as a fulcrum and merely act to idly stretch the spring 65 connected with that lever and the position of the lever 61 connected therewith will not be disturbed. As will appear later a printing operation will therefore occur during the next revolution of wrist pin 16 if all of the levers 64 are thus idly vibrated during any given revolution of said wrist pin.

If, however, any one of the several pins 62 is not so held against lateral movement then when one of the cam projections 90 engages the lever 64 of that pin the spring 65 will function as a fulcrum and lever 64 will act to swing lever 61 on its fulcrum 62 thereby shifting its push-bar 59 against the cross-bar 57 and swinging the frame including the arms 55 and 54, Figs. 7 and 9 on the shaft 45 to cause the arm 54 to engage the upwardly extending arm of lever 50, Fig. 6, and swing the latter on its fulcrum 51 in a clockwise direction into a position where it is caught and supported by a spring pressed latch 95, Figs. 2 and 5. The engagement of the cam projections 90, Fig. 8, with the studs 66 occurs at the end of about 180 degrees of movement of the wrist pin 16 from its starting point above shaft 1, and at a time when the feed dogs 23 are approaching the limit of their rearward movement, as shown in Fig. 5, and also at a time when two arms 92 and 93, Fig. 2, fast on rock shaft 19, are some distance away from the rear free end of the push bar 48 and the arm 94 of latch 95 with which they respectively co-operate. Therefore, the movement of lever 50 effected by arm 54, carries the pin 49 on said lever downward thus lowering the rear free end of push-bar 48, Figs. 2 and 6, into the path of the arm 92 on rock shaft 19 so that as the wrist pin continues its movement from the position shown in Fig. 5, said arm 92 engages the rear end of bar 48 and acts through said push-bar to swing the arm 35 into its upper inoperative position. The arm 35 is thus elevated by arm 92 while the cam 36 is near the limit of its upward swing after which said cam descends slightly whereupon the wrist pin 16 completes its revolution. The slight downward movement of the cam 36, which takes place just as the wrist pin 16 is completing its revolution, brings the rise or swell on cam 36 into position in the path of the roll carried by the now elevated arm 35 as shown in Fig. 6, and immediately thereafter, just as the wrist pin completes its revolution, the arm 93 engages the arm 94 of the latch 95 allowing the spring 53, acting through lever 50, to lift the free rear end of the push rod 48 clear of arm 92 whereupon the arm 35 falls against the cam 36, as shown in Fig. 6. Now while the wrist pin 16 makes its next revolution the arm 35 will idle in its upper position as shown in Fig. 2 and the printing lever 29 will not be operated and this idle condition of lever 29 will continue during subsequent revolutions of pin 16 if the frame 54—55 is actuated during each of the latter.

If, during any revolution of wrist pin 16 all of the pins 62 are held against lateral movement when the shaft 68, Fig. 7, is actuated, then all of the levers 61 and push-bars 59, as well as frame 54—55, will remain at rest, so that as soon as cam 36 reaches its elevated position the arm 35 will drop into position to cooperate with said cam with the result that during the next revolution of wrist pin 16, the printing lever 29 will be actuated.

Figures 12, 14:
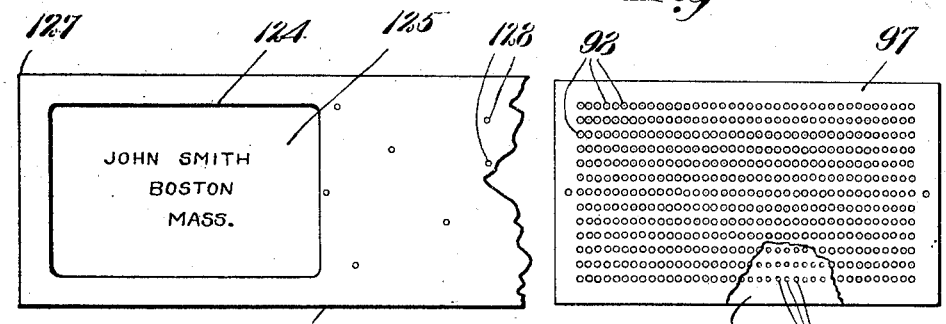
Figure 12 is a detail relating to the detecting mechanism.
Figure 14 is a view showing one of the master cards.

Mounted to slide vertically within the pin box 89, Fig. 9, is a carriage comprising two end pieces 96 sliding in vertical ways provided within said box; a cross-bar 97 and a plate 99, the cross-bar 97 being a relatively thick plate formed with circular apertures 98. To the under side of plate 97 is fastened the relatively thin plate 99 made with registering, but smaller circular apertures 111 therethrough. Both sets of apertures are, as shown in Fig. 12, disposed in rows or groups extending across the plates 97 and 99, from front to rear thereof, and within each hole of plate 99 is mounted the shank or stem of a pin or bolt 100, said shank being provided at its upper end, above plate 99 and within the registering aperture of plate 97, with a head 101 that is larger than the hole in plate 99. Between the plate 99 and the relatively large lower end portion of each pin or bolt 100 is a light spring 102 surrounding the shank thereof. The lower relatively large ends of the bolts or pins 100 are slidably mounted in apertures 105$^a$ provided in the bottom wall 105 of pin box 89. Immediately beneath the pin box 89, and forming a part of the table or bed 20, over which the stencil cards travel in passing from the storage hopper 21 to the receiving hopper 27, is a metal bed plate 103 made with apertures 104 having the same arrangement as, and alined or registering with, the perforations or apertures of the bottom wall 105 of the pin box 89.

The end pieces 96 of the pin box carriage carry trucks or rolls 106 occupying the grooves of two cams 107 that are fast on the shaft 88, heretofore referred to, and near one end thereof the shaft 88 has splined on it a clutch member 108 yieldingly held by a spring 109 against a clutch face 110 provided on the gear 87.

At the start of a revolution of the wrist pin 16 the feed dogs 23 are at the limit of their movement toward the pin box 89, having just fed a stencil card into position beneath the latter, and as the wrist pin 16 rotates the feed dogs 23 move rearwardly while at the same time the movement imparted to shaft 19, Fig. 7, acts through the arm 85, and links 84 and 77 to swing the segment lever 75 on its fulcrum 76. Movement of lever 75 in this direction acts through the pinion 87 and clutch 108—110 to rotate shaft 88 to the extent of one-half of a revolution. The grooves of cams 106 are so constructed that during each half revolution thus imparted to the shaft 88 and its cams, the carriage including the two end pieces 96 and plates 97 and 99, Fig. 9, is quickly lowered at the start of the movement of shaft 88; held in its lowered position until near the completion of the movement of the shaft 88, and then quickly raised to its normal position again just as the shaft completes its movement. It is during the time that this carriage dwells in its lowermost position, and just before it is returned to its uppermost position by the cams 107, that the cam projections 90 are shifted past the studs 66 of the levers 64 to set the push-bar 48, Fig. 2, if the physical characteristics of the stencil card then in position under the pin box require said lever to be set to prevent printing during the nexet revolution of the wrist pin 16, or to idly operate levers 64 so as to leave the push bar 48 in its lower normally operative position if the physical characteristics of the card in position under the pin box calls for a printing operation during said next revolution of the wrist pin 16. Thus, during each revolution of the wrist pin 16, the machine will be adjusted or set so as to effect a printing operation during the next, or following revolution of said pin if all of the pins 62, Fig. 8, are held against lateral movement when the cam projections 90 actuate the levers 64 to thereby prevent movement of any of the levers 61. Or if any one or more of the pins 62 is not so held against movement, then its lever 61 will be actuated when the cam projections 90 actuate the levers 64 which will condition the machine so that no printing operation will be effected during the next, or following revolution of the wrist pin.

Each pin 62 is fixed in a lug 112, Fig. 7, that is part of a member 113, herein termed a "shuttle," that is slidably supported in position against the under side of the plate 103, Figs. 7 and 9, by a perforated plate 114 fixed to the latter. These shuttles 113 are all arranged side by side in one plane immediately beneath the pin box 89, each connected by its pin 62 with a pair of levers 61, 64, and each formed with apertures or perforations registering with some of the perforations of the bottom wall 105 of the pin box. The perforations or holes of these shuttles are disposed in rows corresponding with the arrangement of the holes or apertures of the pin box, and the holes of each shuttle register with and correspond in number with the group of holes above said shuttle.

Figure 13:
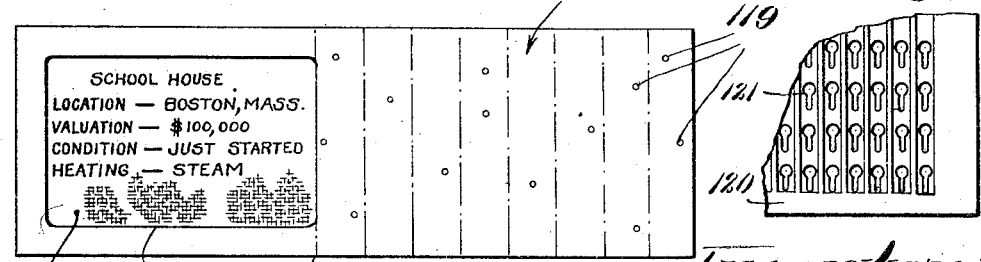
Figure 13 is a view showing one of the stencil cards.
Figure 18:
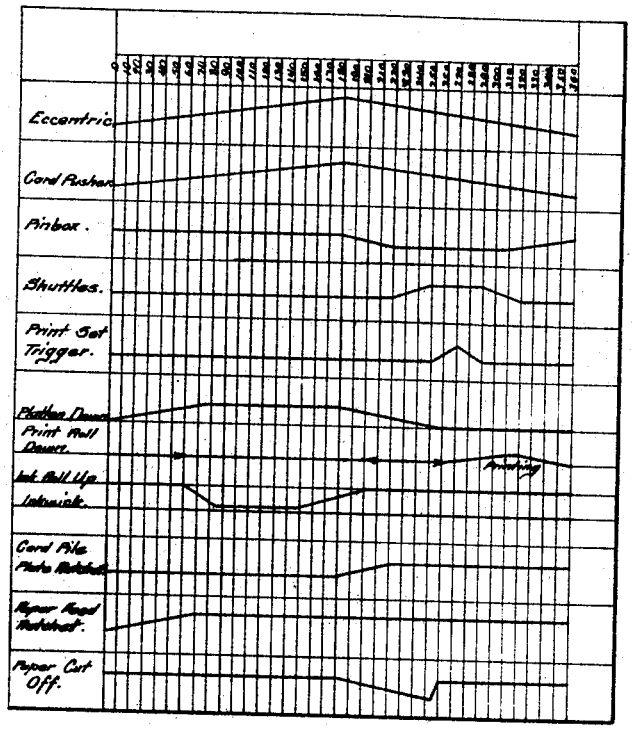
Figure 18 is a chart showing the timing of the machine.

Each stencil card 115, Fig. 13, is made from a rectangular piece of suitable sheet material such as stiff cardboard and is formed with a window 116 near one end thereof over which is stretched and secured a stencil 117. The body portion 118 of the stencil card is about as long as the overhanging part of the pin box 89 and the cards are fed through the machine so that said body portion comes sidewise into position under said box when the card is fed forward from the hopper 21, suitable guides being provided upon the top of table 20 to engage the ends of the card and direct its forward movement. This body portion 118 of each card is, in effect, divided into zones one for each factor of a given subject and in Fig. 13 dot and dash lines are employed to indicate these zones, each of the latter extending across the card from front to rear and corresponding in width with the width of the shuttle 113 that is immediately beneath, and registers with, the same when the card is in position under the pin box. Some or all of these zones of each card are formed with one or more definitely positioned perforations 119 and when a card 115 comes into position under the pin box 89 these perforations register with some of the holes of the bottom wall 105, Figs. 7 and 9, of the bed plate 103 and of the shuttles 113, each of the latter being held in a normal position with its holes registering with holes of the pin box by its lever 61, which latter assists in supporting the weight of the frame including the rod 56 and bar 57 and is held at the limit of its movement in one direction by said weight.

It will thus be seen that if the pin box is provided with active or operative pins cooperating with all of the zones of each card, and there are holes in any one or more of the cards corresponding in number and arrangement with at least one of the active pins of each zone, then when such a card comes into position under the pin box, and the pins are lowered as described, one or more pins will pass through the card and into the hole or holes of each shuttle thus locking the same so that none of the levers 61 will be actuated by the cam projections 90 and therefore the printing mechanism of the machine will be conditioned, prepared or left undisturbed, and will operate to effect a printing operation during the next revolution of the wrist pin 16 after that card has been advanced to printing position. If, however, a card comes into position under the pin box which does not have a combination of holes corresponding in arrangement with the arrangement or disposition of the active or operative pins of the pin box, then when the pins are lowered into engagement with the card one or more of the shuttles 113 will not be locked against movement, thus leaving the pin or pins 62 thereof free to move laterally when the cam projections 90 actuate the levers 64, with the result that the lever or levers 61, connected with the unrestrained pins 62, will be actuated and the printing mechanism of the machine will be prepared or conditioned so as to idle and omit a printing operation during the next revolution of the wrist pin 16 when that card occupies printing position.

My invention contemplates incorporating in the machine only such pins or bolts 100 as are to actively participate in its operations in which case a less number of pins 100 may be provided than there are holes in the pin box, and these pins will be particularly and definitely distributed in the pin box holes as required by the service the machine is to afford. My invention also contemplates the incorporation in the machine of just as many pins or bolts 100 as there are holes in the pin box, in which case I may make use of a "master card", before referred to, and also construct the pin box so as to include, as herein shown, means for maintaining certain selected pins inactive so that they will not participate in the operations of the machine, these pins being selected and rendered inactive or inoperative, according to the requirements of the service the machine is to afford by means of the master card referred to.

Within the pin box 89, and supported by the plate 97, is a locking slide 120 made with a plurality of button-hole slots 121, Fig. 11, that register with the perforations 98 of the plate 97. Slide 120 is provided near one end with an upstanding yoke between the branches of which is swivelled the head 122 of a screw 123 mounted in the adjacent wall of the pin box. Adjustment of this screw 123 shifts the slide 120 cross-wise of box 89 so that either the relatively large ends of the button-hole slots may be positioned opposite the perforations of the plate 97 or the relatively narrow ends of said slots may be positioned opposite said perforations. It will thus be clear that if the slide 120 is placed in its first position and then some of the shuttle locking pins or bolts 100 are raised so that the heads at their upper ends are above the locking slide 120, then those elevated pins will be locked in their raised positions by the slide 120 when the latter is adjusted, by means of screw 123, into its second or pin locking position.

A master card 127 such as shown in Fig. 14 is the means herein provided for use in making this adjustment of the pin box mechanism preparatory to running the set of stencil cards through the machine, and for a given service there may be many of these master cards. Each master card may be made with a window 124 over which is secured a stencil 125 which may, as shown in Fig. 14, bear the name and address of an individual.

Also, each stencil card has its body portion 126 made with a group of definitely positioned perforations 128.

To prepare the machine for operation a set of stencil cards is placed within the hopper 21 and a master card 127 is placed in position under the pin box 89 as shown at 126 in Fig. 9. The operator then causes the machine to "turn over" until the cams 107 have lowered the pin carriage 96—97 to its lowest point. Here the operator stops the machine; manually sets the lever 50 in engagement with the latch 95 and adjusts screw 123 so as to move the locking slide 120 into its position where the relatively narrow ends of the button-hole slots 121 are opposite the perforations of the pin carriage plate 97. When the pin carriage is thus lowered before adjusting plate 120, some of the pins or bolts 100 pass through the perforations of the master card while the other pins or bolts, engaging said card where there are no holes, have their downward movement with the pin carriage 96—97 arrested with the result that when the pin carriage reaches its lowest point these latter pins or bolts are supported by the master card with their upper headed ends projecting through the large ends of the holes of the locking slide.

Therefore, when the operator halts the movement of the machine at the point where the pin carriage is at its lowest point and shifts the locking slide by means of the screw as described, those pins or bolts which are supported by the master card are locked in their relatively elevated positions and therefore remain inactive during the subsequent operations of the machine.

After thus adjusting the locking slide 120 the treadle 12 is depressed and the machine thereby caused to operate continuously, said treadle being locked in its depressed position by a hand operated latch lever 12$^a$ fulcrumed at 12$^b$ on the frame of the machine. At the start, the wrist pin 16 completes its first revolution, raising the pin carriage 96—97 and feeding forward the first (lowermost) stencil card from the hopper 21, and the latter shoving the master card forward into printing position. During the next, or second, revolution of the wrist pin a printing operation will be effected for the reason that during the preceding, or first revolution, all of the shuttles 113 were locked against movement. As a result, the matter contained on the stencil of the master card will be printed upon the strip 271 after which the second stencil card is fed forward from hopper 21 and the master card is shoved forward by the first stencil card into the receiving hopper 27. Thereafter, as the machine continues to operate, each stencil card having the effective combination of perforations is printed upon the strip 271 and those stencil cards which do not have the effective combination pass idly through the machine from storage hopper 21 to receiving hopper 27. Of course, in those cases where the master card does not require the use of all of the shuttles 113 with which the machine is equipped, then those shuttles not required are rendered inoperative and caused to remain in their normal positions by unhitching the springs 65 of the levers 64 connected with those shuttles or by removing levers 64 and 61.

The strip of paper 271, Figs. 3, 4, 15, 16, and 17, upon which the printing is done is stored in a roll 130 mounted upon a spool rotatably supported by a spindle 131 supported in bearings on the frame of the machine, the paper being led downwardly from this roll between a pair of fixed guide bars 132 on the frame of the machine, and thence downwardly through a hole in table 20 and between a pair of jaws 133 and 134 on a carriage 136, the jaw 133 being pivotally supported at 135 and yieldingly urged toward the other jaw to grip the paper strip by a spring 137. The carriage 136 is slidably mounted upon two upright bars 138 and 139 forming part of the frame of the machine and depending from the under side of the table 20, said carriage having pivotally mounted thereon a cam or wedge 140 co-operating with the jaws 133 and 144, and also with two stationarily supported abutments 145 and 146 on the bar 139. The carriage 136 is connected through a link 147 with the free end of an arm 148 fast on a rock shaft 149 at the rear of the machine, said rock shaft carrying, at its opposite end an arm 150 connected by a link 151 with the printing lever 29. It will therefore be clear that whenever the printing lever is vibrated the paper feeding carriage 136 will be reciprocated on its supporting and guiding bars 138 and 139. Normally, the carriage 136 is at the limit of its upward movement; the wedge 140 is out of engagement with the jaws 133 and 134, and the latter are held clamped to the paper strip 271 by the spring 137. When the printing lever is actuated it acts through the connections described to first move carriage 136 downward to the limit of its movement in that direction and then to return said carriage to its uppermost position again. During the downward movement of carriage 136 the jaws 133 and 134 carry the paper strip 271 with them until, near the end of the downward movement of the slide, the wedge 140 engages the abutment 145, whereupon said wedge is forced into position between the jaws spreading them apart and releasing the paper. During the following upward movement of the slide the wedge 140 remains between the jaws so that the latter are open until the wedge engages the upper abutment 146 whereupon the wedge is forced out from between the jaws and the latter are again closed by their spring upon the paper in preparation for the next feeding movement of the slide 136.

Surrounding the spool of the roll of paper, near one end thereof, is a hair-pin-like spring 152 whereof one end is anchored to an abutment 153 on the frame of the machine while the other end co-operates with an arm of lever 154 fulcrumed at 155 on the frame of the machine. This lever 154 has pivotally connected with it the upper end of a rod 156 which extends downwardly therefrom between the times of a forked arm 157 fast on the shaft 149 at the rear of the machine. When the shaft 149 is rocked by movement of the printing lever the two arms 148 and 157 are swung downwardly, and near the end of their downward movements, just as the jaws 133 and 134 are unclamped from the paper strip, the arm 157 strikes a collar on the rod 156 and pulls the same downwardly thereby swinging the lever 154 in a direction to cause it to wipe against the free end of the spring 152 thereby contracting said spring on to the spool of the roll of paper to prevent over running of the latter.

From the paper gripping jaws 133 and 134 the paper strip extends downwardly in a loop whose other stretch extends upwardly over a guide roll 158 mounted on the table 20 and thence horizontally across the table, in front of the pin box, to and between a pair of guide arms 159 projecting from the latter and occupying a position to one side of the path of the platen 32.

At the opposite side of the path of the platen 32 the strip passes under suitable guides 160 and 161 to the cutting devices presently to be described. The pin box 89 overhangs the path of the body portions of the stencil cards while the stretch of the paper strip 129 between the guides 159 and 160 overhangs the path of the window portions of said cards, and as each card comes into printing position its stencil window occupies a position immediately below said stretch. It will therefore be clear that when the platen descends it will press said stretch down against the stencil of the card occupying printing position and hold it in this position while the ink applying roll 39 travels back and forth against the under side of the stencil.

From the guide bracket 161 the paper passes between a pair of feed rolls 162 and 163 up to a pair of cutters 164 and 165 herein shown as blades extending across the strip and between which the latter is propelled by the feed rolls 162 and 163.

The shaft 162ª of the upper feed roll 162 is journaled in bearings on table 20 and has loosely mounted thereon a pinion 164ª in mesh with a rack bar 165 mounted to slide in vertical ways on the frame of the machine. The upper end of this rack bar 165 carries a stud 166 occupying a slot provided through the free end portion of an arm 167 fast on a rock shaft 168 journaled in bearings on table 20. At its opposite end the rock shaft 168 has fast on it a slotted arm 169 engaged by a stud 170 projecting from the printing lever 29. Thus movement of the printing lever 29 acts through the connections just described to oscillate the pinion 164 that is loose on the shaft of the upper feed roll 162. One end of this pinion 164 is made with a ratchet clutch face to co-operate with a clutch member 171 that is splined on shaft 162ª and yieldingly urged toward the pinion 164 by a coiled spring 172. The clutch consisting of the pinion 164 and member 171 is constructed so that the rack bar 165 actuates the feed roll 162 only on its up movement when the printing lever is returning to its upper or retracted position. Pinions 173 and 174 compounded with the feed rolls 162 and 163, respectively, ensure the two rolls turning together.

The lower cutting blade 165 is fixed to the frame of the machine while the upper cutting blade is movably supported by a pair of parallel links 175 pivotally mounted on the frame of the machine, and is normally supported in an elevated position above the path of the paper strip by a spring pressed plunger 176 bearing against one end thereof. The opposite end of the upper movable cutter co-operates with one arm of a bell crank lever 177 fulcrumed at 178 on the frame of the machine, while the other arm of said lever co-operates with a stud 179 projecting from the side of arm 167.

During the return stroke of the printing lever 29 the feed rolls are actuated thereby to feed the paper strip forward past the cutters 164 and 165 for a predetermined distance sufficient to carry the printed matter beyond the cutters. The paper strip remains in this position until the printing lever is again actuated when, during the forward or printing stroke of said lever the stud 179 acts through the bell crank 177 to lower the cutter 164 and sever from the strip of paper the previously printed portion. Thus a cutting operation is effected during each printing stroke of the printing lever. The pieces of paper thus severed from the strip fall in orderly fashion into a hopper, 187 on the frame of the machine.

The shelf 28 onto which the stencil cards fall when ejected from printing position 70 is slidably mounted, at one end, upon a square upright rod 180 fixed at its ends to the frame, and is also connected to an endless metal band 181 carried by two pulleys 182 and 183. The upper pulley 182 is fast on the forward end of a shaft 184 whose rear end carries a worm gear 185, intermittently actuated step-by-step by a worm 186 on the hereinbefore mentioned shaft 79, Figs. 7 and 8, as the machine continues to operate, and as will be clear, this step-by-step rotary movement of the worm gear 185, shaft 184 and pulley 182 imparts a step-by-step movement to the metal band 181 thereby slowly lowering the shelf 28 as the pile of cards thereon grows in height. In this way the top of the pile is automatically maintained at a fixed point or height.

The form of pin box illustrated in Fig. 9 is constructed and adapted for use with a master card such as shown in Fig. 14, said card being merely used temporarily in setting the pins 100 after which it is removed from the machine. In Fig. 10 I have illustrated another form of pin box with which another kind of master card is used. In Fig. 10, which is a longitudinal sectional view of the pin box, the bottom wall 105ª thereof is made upon its under face with a recess to receive a master card 126ª which is made without a stencil and shorter than the stencil card shown in Fig. 14. This master card is held within the recess referred to by a perforated metal plate 228 held in place by screws (not shown). There is provided a master card 126ª for each subject and each of said cards will be formed with a group of particularly arranged perforations appropriate to the factors of that subject. It will be clear, therefore, that when one of these cards 126ª is incorporated in the machine as described only those pins 100 that register with perforations of card 126ª will be operative, the other pins being held elevated by the card, as shown in Fig. 10, so that they are inoperative. It will also be clear that with a master card 126ª in position in the pin box, only those stencil cards having a corresponding set of perforations will be printed. Of course, a new master card will be substituted after each "run" of the set of stencil cards.

Figure 19:
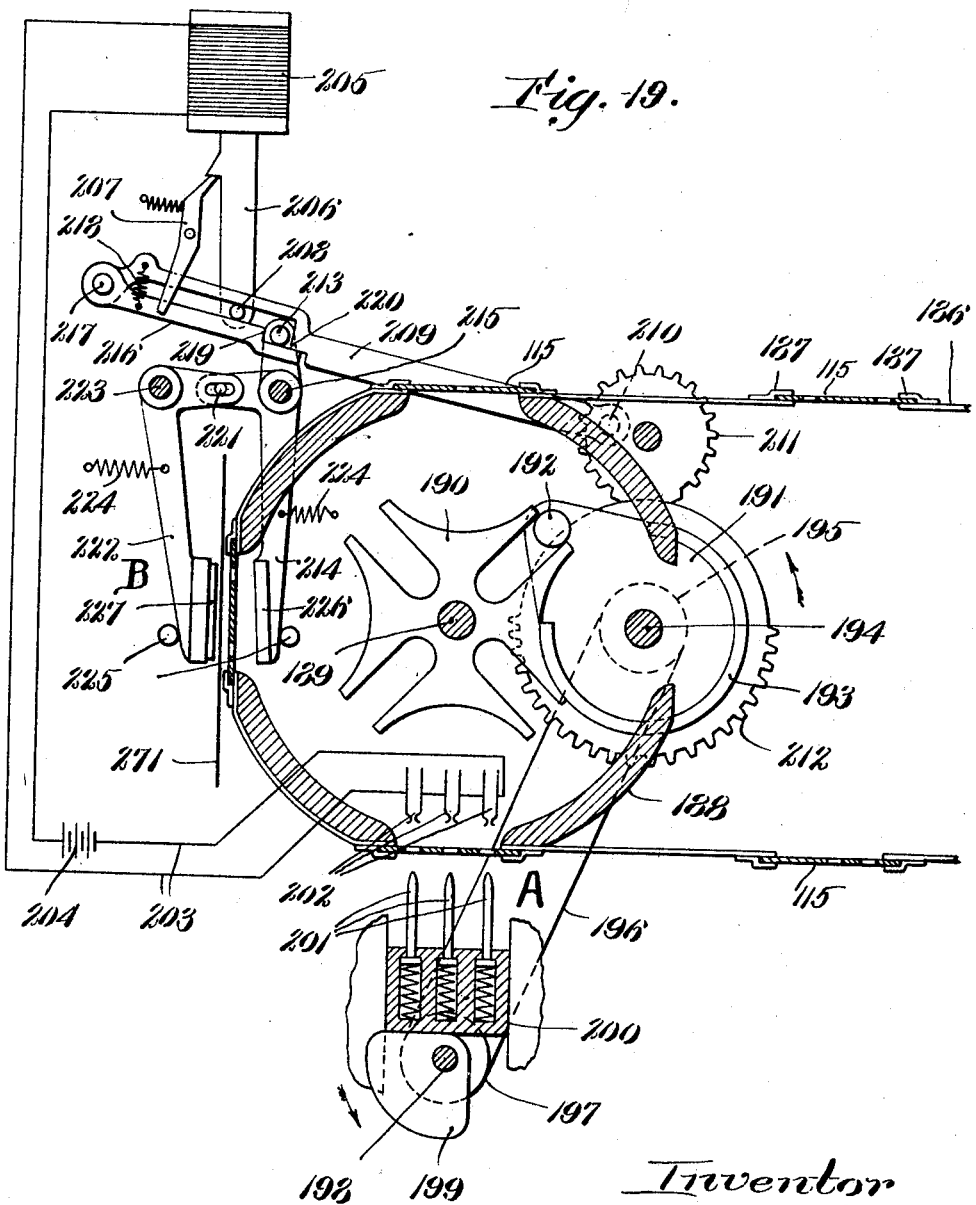
Figure 19 is an illustrative diagrammatic view hereinafter described.

Figure 19 shows, more or less diagrammatically, another form of my invention and in said figure 186 is an endless belt-like carrier for the cards 115, said carrier being constructed with suitable clips 187 to adapt it to receive and hold the cards. Carrier 186 is supported by two drums or wheels, one of which, shown at 188, is mounted upon a shaft 189 carrying a slotted wheel 190 that is engaged and driven by a wheel 191 constructed with a pin 192 co-operating with the slots of wheel 190 and with a flange 193 co-operating with the periphery of wheel 190, rotation of wheel 191 causing the pin 192 to intermittently actuate the wheel 190 and the flange 193 to intermittently engage and hold said wheel against rotative displacement between movements. The wheel 191 is fast on a shaft 194 that is continuously driven in the direction of the arrow through suitable means, not shown.

Shaft 194 carries a pulley 195 acting through a belt 196 and pulley 197 to continuously rotate a shaft 198 at the same speed as shaft 194. On shaft 198 is a cam 199 supporting and actuating a slide 200a mounted in vertical ways on the frame of the machine, said slide being raised by the cam and lowered by gravity. The slide 200 carries a plurality of spring pressed pin contacts, or switch members, 201 cooperating with a plurality of pairs of stationarily supported spring contact members 202 arranged in series in a circuit 203. Circuit 203 also includes a battery 204 and the winding of the magnet of a solenoid 205. The core 206 of this solenoid is made with a shoulder co-operating with a pivoted spring pressed latch 207 and is also provided with a stud 208 occupying a slot provided in a pitman 209. At one end thereof the pitman 209 is connected with a wrist pin 210 carried by a mutilated pinion 211 that is intermittently rotated, to the extent of one revolution, by a mutilated gear 212 fast on the shaft 194. When solenoid 205 is energized its core 206 is lifted and acts through stud 208 to raise the free end of pitman 209 which places said pitman in co-operative relationship with a stud 213 projecting laterally from a printing lever 214 fulcrumed at 215.

One side of the slot in pitman 209 is constituted by a latch 216 pivotally connected by a stud 217 to the free end of pitman 209 and held against the side of the latter by a spring 218. The stud 217 projects laterally from the side of pitman 209 and co-operates, as presently described, with latch 207. Latch 216 is formed with a shoulder 219 to engage stud 213 when the pitman 209 is moved in one direction, while the body portion of said pitman is made with a shoulder 220 to engage stud 213 when the pitman is moved in the opposite direction. It will thus be clear that when the solenoid is de-energized and the pitman is not held elevated by the core 206, said pitman will idly slide back and forth on the stud 213, and it will also be clear that when the solenoid is energized and its core is lifted the stud 213 will occupy a position between the shoulders 219 and 220 and, when the pitman is actuated, will be engaged and moved back and forth by said shoulders thereby imparting a vibratory movement to lever 214. The lever 214 is a bell-crank and is coupled at 221 to a second bell-crank 222 fulcrumed at 223. Springs 224 normally hold the levers 214 and 222 against stops 225.

The lever 214 is constructed with a platen 226 while the other lever 222 is constructed with an ink holding pad 227. As the cards 115 travel around the wheel 188 their stencil ends pass between the platen 226 and pad 227, and during each period of rest of said wheel one of the cards occupies the position between said members and alongside a paper strip 271 also occupying a position between said members.

As pointed out, the two shafts 194 and 198 rotate in unison and, starting with the parts in the positions shown in Fig. 19, the wheel 188 is turned one fourth of a revolution by stud 192 during the first quarter-revolution of shaft 194 which brings a card 115 into position A where it is engaged by detecting mechanism including pins 201 and at the same time the preceding card is shifted from position A into printing position at B. During the following half revolution of shaft 194 segmental gear 212 imparts one complete revolution to pinion 211 thereby actuating pitman 209 and while pitman 209 is being thus actuated the slide 200 is raised. During the last quarter revolution of shaft 194 the slide 200 is lowered. Thus, immediately after a card 115 arrives at position A the detector pins 201 are raised and if that card is constructed with an effective group of perforations, viz. a group of perforations corresponding in number and arrangement with the pins 201, then all of said pins will pass through the card and, by engagement with the spring contacts 202, complete the circuit 203 of solenoid 205 whose core is lifted and locked in that position by latch 207. This upward movement of core 206 occurs near the end of that cycle of the machine during which the card was moved into position A at about the time that the pitman 209 is near the limit of its movement toward the right but moving toward the left, and it is for this reason that the lower side of the slot of said pitman is made as a spring pressed latch which permits it to yield under the pull of the solenoid core, said latch being then restrained from upward movement by the stud 213. As soon as the pitman reaches the limit of its movement toward the left (the position shown in the drawing) the latch 216 is raised into position behind stud 213 by its spring 218. This automatic positioning of pitman 209, however, is brought about only by a card having the effective combination of perforations. When a card not having this effective combination of perforations occupies position A all of the pins 201 will not pass through it so that circuit 203 is not completed and as a result pitman 209 remains in its lowermost inoperative position and the printing levers 214 and 222 are not operated during the next cycle of the machine.

In Fig. 19 the pitman 209 is shown in its upper operative position where it is held by the latch 207, while the pin 192 occupies its position at the start of the cycle, the slide 200 having just been lowered after having completed circuit 203. At the start of the movement of pin 192 from the position shown the card at position A is shifted to position B and immediately thereafter the printing levers 214 and 222 are operated. As the pitman 209 completes this printing operation and reaches the limit of its movement toward the right the stud 217 engages the tail of latch 207 and frees the core 206 allowing the latter and pitman 209 to fall to their lowermost positions again where they remain until another card having the effective combination of perforations arrives at position A.

The detector mechanisms shown in Figs. 7, 9 and 10 are constructed each with a plurality of shuttles 113, one for each factor, each of which is normally free to be actuated by cam shaft 68, and in the event that any one (or more) of these shuttles is unlocked at the moment cam shaft 68 is operated, then the control mechanism including shaft 45 will be operated to prevent the machine from printing. In Fig. 20 I have illustrated a form of detector mechanism which dispenses with shuttles. In this form of mechanism a series of vessels 230ª, 230ᵇ and 230ᶜ, made from non-conducting material, is incorporated in the table or bed 20 immediately below the path of the stencil cards 126, and each of these vessels contains a body 231 of mercury. The upper perforated plate 99 of the pin carriage 96—97 is made of insulating material and has fastened to its under side two conductor plates 232 and 233 which are perforated to accommodate the shanks of the pins 100 with which they are electrically connected mainly through the springs 102. The mercury of vessel 230ᵇ is connected with the mercury of vessel 230ᶜ by a conductor 234. The conductor plate 233 is connected by a wire 235 with one end of the winding of an electro-magnet 236, the opposite end of said winding being connected by a wire 237 with one pole of a battery 238 whose opposite pole is connected by a wire 239 with the mercury of vessel 230ª. It will be clear that if, when carriage 96—97 is shifted into its lowermost position shown in Fig. 20, the stencil card 126 then in position beneath the detector mechanism permits one or more pins 100 to enter the mercury of each vessel, then the circuit of magnet 236 will be completed and its armature 240 will be lifted. It will also be clear that unless at least one pin 100 enters the mercury of each vessel, then this circuit will not be completed. The armature 240 is fast upon a shaft 241 which will operate through suitable mechanism, not shown, to control the actuation of shaft 45 by shaft 68, so that the lifting of armature 240 will result in a printing operation being effected and so that if the armature is not lifted no printing operation will occur.

With the detector mechanism illustrated particularly in Figs. 7, 8 and 9, the machine is caused to perform a printing operation only when all of the levers 61 are locked immovable through the engagement of pins 100 with their slides so that the machine will be caused to print by any card having the particular combination of perforations which permits the pins 100 to lock all of the shuttles. Thus the use of a machine so constructed is limited to one particular and comparatively simple class or line of service. In other lines of service, however, it is required that the machine shall function so that a printing operation will be performed provided the card or control unit is made with a definite predetermined dominating and essential physical characteristic accompanied by, or combined with, one or the other of two or more other definite subordinate, but nevertheless essential, physical characteristics. Such a card or unit might have a single perforation constituting the dominating physical characteristic which in every case would be essential to effect an operation but effective only when accompanied by, or associated with one or the other of two or more subordinate physical characteristics, and these subordinate characteristics might be constituted by other perforations or groups of perforations. In Figures 21 and 22 I have illustrated a detector mechanism meeting these requirements which is an alternative for that illustrated in Figs. 7, 8 and 9.

In this form of detector mechanism the levers 61 and slides 59 of Fig. 7 are dispensed with and a series of pairs of contacts a, b, c, d, e, f, g and h is provided supported in position to co-operate with the lower ends of levers 64, each pair including a movable and a fixed member. The movable contact of the pair a is connected by a wire 242 with one pole of a battery 243 whose opposite pole is connected by a wire 244 with one end of the winding of a magnet 245. The opposite end of this winding is connected with a wire 246. The fixed contact of the pair is connected by a wire 247 with the movable contact of each pair b, c and f. The fixed contacts of pairs b, e and h are connected with the wire 246. The fixed contact of pair c is connected by a wire 248 with the movable contact of pair d and the fixed contact of the latter pair is connected by a wire 249 with the movable contact of pair *e*. The fixed contact of pair *f* is connected by a wire 250 with the movable contact of pair *g*, while the fixed contact of pair *g* is connected by wire 251 with the movable contact of pair *h*. It will thus be seen that magnet 245 is normally de-energized but that its circuit will be completed and the magnet energized if the two pairs of contacts *a* and *b* are closed; if the pair *a* together with the pairs *c*, *d* and *e* are closed, or if the pair *a* together with pairs *f*, *g* and *h* are closed. The closing of pair *a*, therefore, being always essential to operation of magnet 245 constitutes the dominating pair, and while the closing of either the pair *b*; or the group *c*, *d* and *e*, or the group *f*, *g* and *h*, is essential to that operation, they are alternative in the sense that the closing of any one or the other of these latter when the pair *a* is closed, results in the operation of the magnet.

As shown in Fig. 21 the magnet 245 is fixed to the frame of the machine and has an armature 252 fulcrumed at 253 and normally held away from the magnet and against a stop 254 by a spring 255. Armature 252 carries a roll 256 normally supporting a pawl 257 pivotally connected at one end to an arm 258 fast on rock shaft 19. At its opposite end the pawl 257 is made with a slot 259 and a tooth 260, co-operating with a stud or cross-bar 56$^a$ carried by the arms 54—55 that are fast on the rock-shaft 45, the latter controlling the power transmitting devices of the printing mechanism as already described. Normally the spring 255, acting through the armature 252, yieldingly holds the bottom side of slot 259 against the cross-bar 56$^a$ and as the arm 258 vibrates, and pawl 257 is reciprocated with the chaft 19, the tooth 260 engages bar 261 during each movement thereof toward the left (Fig. 21) and swings arm 55 with it until, near the end of the movement of the pawl, the tooth clears bar 56$^a$, whereupon the frame of which arm 55 forms part, falls by gravity back to its normal position. Each time the arm 55 is thus vibrated it acts through the parts described in connection with Fig. 7, to set the lever 50 to prevent operation of the printing mechanism but this setting of the lever 50 will not be effected if the magnet 245 is de-energized during the movement of pawl 257 toward the left for the reason that in such event the magnet attracts its armature 252 thereby permitting pawl 257 to fall which carries the tooth 260 out of engagement with bar 56$^a$ before lever 50, Fig. 6, is engaged with latch 95.

With the arrangement of contacts shown in Fig. 22, eight shuttles 113 and eight levers 64 are provided, the latter each co-operating with one of the movable contacts of the series as shown in Fig. 21. Therefore, each control unit or card will have eight zones, one for each shuttle, so that a card having a perforation within the zone of the shuttle of contacts *a* and the zone of contacts *b*; or having a perforation within the zone of the shuttle of contacts *a* and the zones of contacts *c*, *d* and *e*, or *f*, *g* and *h*, will act through the detector mechanism to cause the machine to effect a printing operation. The other cards of the set having other combinations of holes will pass idly through the machine.

From the above description it will be seen that my invention is particularly useful in connection with the classification of data by the selective segregation thereof into series of data-groups, and provides a method of, and means for, effecting a classifying of multi-item data groups in such a manner that in a series composed of such selected groups, each selected data group will include some one or more kind of data items which belong, respectively, in predetermined and different classes of the data items. Thus my invention contemplates the classifying of data items into variable but related groups, and these groups into group-series, by a selecting method which, in principle, may be compared with differentiation as distinguished from integration.

A leading purpose which can now be realized by means of the present improvements, is to bring into one series and classification, groups of data items in which each group of such a series is distinguished by the presence therein of one or more predetermined and primary data items in combination with one or more secondary data-items when these, respectively, shall occur in any one or more predetermined classes of data items.

What I claim is:

1. An automatic selectively operating printing machine for use in connection with a plurality of control units having various individual physical characteristics, said machine comprising printing mechanism; a continuously operating actuator therefor; detecting means controlling the operation of said printing mechanism by said actuator and itself controlled by said units and to which said units are presented one at a time into position to be engaged by said detecting means, and means independent of said actuator for operating the detecting means to cause the latter to engage the units successively and with the assistance thereof to selectively control the operation of said printing mechanism by said actuator according to the physical characteristics of said units.

2. An automatic selectively operating machine constructed in accordance with claim 1, wherein the detecting means is adjustable so that it may be set to effectively and exclusively co-operate with units having any one of several different physical characteristics.

3. An automatic selectively operating printing machine for use in connection with a plurality of control units having various individual physical characteristics, said machine comprising printing mechanism; a continuously operating actuator therefor; detecting means controlling the operation of said printing means by said actuator which is itself controlled by said units; means operating continuously to present or feed the units one at a time into position to be engaged by said detecting means, and means independent of said actuator for operating the detecting means to cause the latter to engage said units successively and with the assistance thereof to selectively control the operation of said printing mechanism by said actuator according to the physical characteristic of the units.

4. In an automatic selectively operating printing machine for use in connection with a plurality of control units having various individual physical characteristics, the combination of a printing member; a main drive shaft; actuating means for said member connected with said shaft; detecting means controlling the operation of said member by said actuating means and which is itself controlled by said units; means for presenting or feeding the units one at a time into position to be engaged by said detecting means, and means through which said shaft operates the detecting means independently of said actuating means to cause said detecting means to engage the units successively as they are presented to it so as to selectively control the actuation of said member according to the physical characteristics of said units.

5. In a machine of the character described the combination with a detector mechanism and means for operating the same, of a plurality of shuttles individually controlled by said detector mechanism; a plurality of levers each having one end thereof pivotally connected with one of said shuttles; a plurality of cams each co-operating with one of said levers intermediate its ends; means for operating said cams in timed relation to the operations of said detector mechanism; a spring connected with the opposite end of each lever so as to yieldingly urge the latter toward its cam, and a plurality of control members each connected with one of said shuttles.

6. In a machine of the character described the combination with the detector mechanism and means for operating the same, of a plurality of shuttles individually controlled by said detector mechanism; a plurality of levers each having one end thereof pivotally connected with one of said shuttles; a plurality of cams each co-operating with one of said levers intermediate its ends; means for operating said cams in timed relation to the operations of said detector mechanism; a spring connected with the opposite end of each lever so as to yieldingly urge the latter toward its cam, and a plurality of control levers each connected with one of said shuttles.

7. In a machine of the character described, the combination with detector mechanism, means for operating said mechanism, and means for feeding control units one at a time into position to co-operate with said detector mechanism, of a plurality of shuttles individually controlled by said detector mechanism; a plurality of levers each having one end thereof co-operatively associated with one of said shuttles; a plurality of cams each co-operating with one of said levers intermediate its ends; means for operating said cams in timed relation to the operations of said detector mechanism; a spring connected with the opposite end of each lever so as to yieldingly urge the latter toward its cam, and a plurality of control members each connected with one of said shuttles.

8. In a machine of the character described, the combination with detector mechanism including a plurality of shuttle locking pins, means for operating said mechanism, and means for feeding control units one at a time into position in the paths of the pins of said mechanism, of a plurality of shuttles disposed upon the opposite side of the path of said units from said detector mechanism and individually controlled by the pins of said mechanism; a plurality of levers each having one end thereof co-operatively associated with one of said shuttles; a plurality of cams each co-operating with one of said levers intermediate its ends; means for operating said cams in timed relation to the operations of said detector mechanism; a spring connected with the opposite end of each lever so as to yieldingly urge the latter toward its cam, and a plurality of control members each co-operatively associated with one of said shuttles and its lever.

9. In a machine of the character described, the combination with detector mechanism including a plurality of shuttle locking pins, means for operating said mechanism, and means for feeding control units one at a time into position in the paths of the pins of said mechanism, of a plurality of shuttles disposed upon the opposite side of the path of said units from said detector mechanism and individually controlled by the pins of said mechanism; a plurality of shuttle operating members each co-operatively associated with one of said shuttles; a plurality of actuators each co-operating with one of said shuttle operating members; means for operating said actuators in timed relation to the operations of said detector mechanism, and means to provide for idle operation of each shuttle operating member by its actuator when its shuttle is locked by the detector mechanism.

10. In a machine of the character described the combination with detector mechanism including a plurality of shuttle locking pins, means for operating said mechanism, and means for feeding control units one at a time into position in the paths of the pins of said mechanism, of a plurality of shuttles disposed upon the opposite side of the path of said units from said detector mechanism and individually controlled by the pins of said mechanism; a plurality of shuttle operating members each co-operatively associated with one of said shuttles; a plurality of actuators each co-operating with one of said shuttle operating members; means for operating said actuators in timed relation to the operation of said detector mechanism; means to provide for idle operation of each shuttle operating member by its actuator when its shuttle is locked by the detector mechanism; printing mechanism; an adjustable member for controlling the operation of the printing mechanism, and means through which either shuttle, when operated, acts to set said last mentioned adjustable member to prevent the operation of said printing mechanism.

11. In a machine of the character described, the combination with detector mechanism including a plurality of shuttle locking pins, means for operating said mechanism, and means for feeding control units one at a time into position in the paths of the pins of said mechanism, of a plurality of shuttles disposed upon the opposite side of the path of said units from said detector mechanism and individually controlled by the pins of said mechanism; a plurality of shuttle operating members each co-operatively associated with one of said shuttles; a plurality of actuators each co-operating with one of said shuttle operating members; means for operating said actuators in timed relation to the operations of said detector mechanism; means to provide for idle operation of each shuttle operating member by its actuator when its shuttle is locked by the detector mechanism: printing mechanism; an adjustable member for controlling the operation of the printing mechanism, and mechanism including a movable element common to all of the shuttles through which either shuttle, when operated, acts to set said last mentioned adjustable member to prevent the operation of said printing mechanism.

12. In a machine of the character described, the combination with a detector mechanism including a plurality of shuttle locking pins; means for operating said mechanism, and means for feeding control units one at a time into position in the paths of the pins of said mechanism, of a plurality of shuttles disposed upon the opposite side of the path of said units from said detector mechanism and individually controlled by the pins of said mechanism; a plurality of shuttle operating members each co-operatively associated with one of said shuttles; a plurality of actuators each co-operating with one of said shuttle members: means for operating said actuators in timed relation to the operations of said detector mechanism; means to provide for idle operation of each shuttle operating member by its actuator when its shuttle is locked by the detector mechanism; printing mechanism; an adjustable member for controlling the operation of the printing mechanism, and mechanism through which either shuttle, when operated during one period of the cycle of the machine, acts to set said adjustable member to prevent the operation of said printing mechanism during a following period of the cycle of the machine.

13. In a machine of the character described, the combination of a printing member; a continuously operating actuator for said member; means for feeding stencil card control units one at a time into printing position; adjustable means through which power is transmitted from said actuator to said printing member, and means independent of said actuator through which said units automatically and selectively adjust said power transmitting means to control the operation of said printing member according to the physical characteristics of said units.

14. In a machine of the character described, the combination of a printing member; an arm pivotally mounted thereon; a continuously operating cam co-operating with said arm; means for feeding stencil card control units one at a time into printing position, and means through which said units automatically and selectively adjust said arm to control the operation of said printing member without stopping the machine according to the physical characteristics of said units.

15. In a machine of the character described, the combination of a printing member; an arm pivotally mounted thereon; a continuously operating cam co-operating with said arm; means for feeding stencil card control units one at a time into printing position; means for shifting said arm into and out of co-operative position with relation to said cam, and means through which said units automatically and selectively control said arm shifting means without stopping the machine to thereby control the operation of said printing member according to the physical characteristics of said units.

16. In a machine of the character described, the combination of a unit controlled detector mechanism; a printing member, means for operating said member; means for feeding one at a time to said mechanism control units having different physical characteristics, and means through which said detector mechanism automatically and selectively controls the operation of said printing member without stopping the machine according to the physical characteristics of said units so that printing operations are effected only by those units having one and the same physical characteristic.

17. In a machine of the character described, the combination of a unit controlled detector mechanism; an operation effecting member; means for actuating said member; means for feeding one at a time to said detector mechanism control units having different physical characteristics, and means through which said detector mechanism selectively controls the actuation of said operation effecting member without stopping the machine according to the physical characteristics of said control units so that actuation of said member is occasioned only by those units having one particular physical characteristic.

18. In a machine of the character described, the combination of a unit controlled detector mechanism; an operation effecting member; means for actuating said member; means for feeding one at a time to said detector mechanism control units having different physical characteristics, and means through which said detector mechanism selectively controls the actuation of said operation effecting member according to the physical characteristics of said control units so that actuation of said member is occasioned only by those units having one particular physical characteristic, said detector mechanism being adjustable by means of a master unit to condition it so as to effectively co-operate exclusively with control units having any one of several different physical characteristics.

19. In a machine of the character described, the combination of a printing member; means for operating said member; means for feeding stencil card control units one at a time into printing position; means through which said units automatically and selectively control the movements of said printing member according to the physical characteristics of said units; and means for feeding paper into printing position in timed relation with the movements of said member.

20. In a machine of the character described, the combination of a printing member; means for operating said member; means for feeding stencil card control units one at a time into printing position; means through which said units automatically and selectively control the movements of said printing member according to the physical characteristics of said units; and means for feeding a strip of paper intermittently past said printing member in timed relation with the movements of said member.

21. In a machine of the character described, the combination of a printing member; means for operating said member; means for feeding stencil card control units having different physical characteristics one at a time into position; means through which said units automatically and selectively control the movements of said printing member according to the physical characteristics of said units; means for feeding a strip of paper intermittently past said printing member in timed relation with the movements of said member, and strip severing means operating automatically to cut said strip transversely into individual printed pieces.

22. In a machine of the character described, the combination of a printing member; means for operating said member; means for feeding stencil card control units having different physical characteristics one at a time into printing position; means through which said units automatically and selectively control the movements of said printing member according to the physical characteristics of said units; means for feeding a strip of paper intermittently past said member in timed relation with the movements of said member; and automatic means operating intermittently in timed relation with the movements of said member to cut said strip transversely into individual printed pieces.

23. In a machine of the character described, the combination of a printing member; means for operating said member; means for feeding stencil card control units having different physical characteristics one at a time into printing position; means through which said units automatically and selectively control the movements of said printing member according to the physical characteristics of said units; a pair of feed rolls for feeding past said printing member a strip of paper that is printed upon, and means through which said printing member operates one of said feed rolls to intermittently feed said paper strip forward in timed relation with the movements of said member.

24. In a machine of the character described, the combination of a printing member; means for operating said member; means for feeding stencil card control units having different physical characteristics one at a time into printing position; means through which said units automatically and selectively control the movements of said printing member according to the physical characteristics of said units, a pair of feed rolls for feeding past said member a strip of paper that is printed upon; means for intermittently operating one of said feed rolls in timed relation with the movements of said printing member; strip cutting devices for severing said strip transversely to separate the printed parts thereof, and automatic means for maintaining slack in that portion of the strip between the supply and said feed rolls.

25. In a machine of the character described, the combination of a printing member; means for operating said member; means for feeding stencil card control units having different physical characteristics one at a time into printing position; means through which said units automatically and selectively control the movements of said printing member according to the physical characteristics of said units; a pair of feed rolls for feeding a strip of paper past said member; means for operating one of said rolls in timed relation with the movements of said printing member, and automatic means for drawing the paper strip from the supply roll in timed relation with the movements of said member so as to maintain slack in that portion of the strip between the supply and said feed rolls.

26. In a machine of the character described, the combination of a printing member; means for operating said member; means for feeding stencil card control units having different physical characteristics one at a time into printing position; means through which said units automatically and selectively control the movements of said printing member according to the physical characteristics of said units; a pair of paper feeding rolls; means for operating one of said rolls in timed relation with the movements of said printing member; automatic means for feeding a paper strip from a supply roll in timed relation with the movements of said member so as to maintain slack in that portion of the strip between the supply roll and said feed rolls, and a brake mechanism for said supply roll operated automatically in timed relation with said slack maintaining strip feeding means.

27. In a machine of the character described, the combination of a printing member; means for operating said member; means for feeding stencil card control units having different physical characteristics one at a time into printing position; means through which said units automatically and selectively control the movements of said printing member according to the physical characteristics of said units; a pair of feed rolls for feeding a paper strip from a supply roll; means for intermittently actuating one of said rolls in timed relation with the movements of said printing member, and automatic means for feeding the paper strip from said supply roll so as to maintain slack in that portion of the strip between the supply roll and said feed rolls, said means including an automatically opened and closed strip engaging clamp and means for reciprocating the same in timed relation with the feeding movements of said feed rolls.

28. In a machine of the character described, the combination of a printing member; means for operating said member; means for feeding stencil card control units having different physical characteristics one at a time into printing position; means through which said units automatically and selectively control the movements of said printing member according to the physical characteristics of said units; a pair of feed rolls for feeding a paper strip from a supply roll; means for intermittently actuating one of said rolls in timed relation with the movements of said printing member; automatic means for feeding the paper strip from said supply roll so as to maintain slack in that portion of the strip between the supply roll and said feed rolls, said means including an automatically opened and closed strip engaging clamp and means for reciprocating the same in timed relation with the feeding movement of said feed rolls, and a brake mechanism for said supply roll operated automatically in timed relation with said strip engaging clamp.

29. The combination with power transmitting mechanism, of detector mechanism to which control units having different physical characteristics are presented one at a time and through which said units control said power transmitting mechanism so that the latter is caused to be effective only by units having one definite dominant physical characteristic associated with one or the other of two or more definite subordinate physical characteristics.

30. The combination with printing mechanism, of detector mechanism to which control units having different physical characteristics are presented one at a time and through which said units control said printing mechanism so that the latter is caused to be effective only by units having one definite dominant physical characteristic associated with one or the other of two or more definite subordinate physical characteristics.

31. The combination with printing mechanism and mechanism for feeding to the same a paper strip upon which said printing mechanism operates, of detector mechanism to which control units having different physical characteristics are presented one at a time and through which said units control said printing and strip feeding mechanisms so that the latter are caused to operate only by units having one definite dominant physical characteristic associated with one or the other of two or more definite subordinate physical characteristics.

32. The combination with printing mechanism, mechanism for feeding to the same a paper strip upon which said printing mechanisms operates, and strip cutting mechanism of detector mechanism to which control units having different physical characteristics are presented one at a time and through which said units control said printing, feeding and cutting mechanisms so that the latter are caused to operate only by units having one definite dominant physical characteristic associated with one or the other of two or more definite subordinate physical characteristics.

33. The combination with power transmitting mechanism, of detector mechanism to which control units having different physical characteristics are presented one at a time and through which said units control said power transmitting mechanism so that the latter is caused to be effective only by units having one definite dominant physical characteristic associated with one or the other of two or more definite subordinate physical characteristics; means for operating said detector mechanism; and automatic means for feeding said units one at a time to said detector mechanism.

34. The combination with power transmitting mechanism, of detector mechanism to which control units having different physical characteristics are presented one at a time and through which said units control said power transmitting mechanism so that the latter is caused to be effective only by units having a definite dominant physical characteristic associated with one or more definite subordinate physical characteristics.

35. The combination with power transmitting mechanism, of detector mechanism to which control units having different physical characteristics are presented one at a time and through which said units control said power transmitting mechanism so that the latter is caused to be effective only by units having a definite dominant physical characteristic associated with one or more definite subordinate physical characteristics, said detector mechanism being adapted to co-operate with control units each having varying dominating physical characteristics and varying subordinate physical characteristics.

FRANKLIN T. MILLER.